(12) United States Patent
Meyer et al.

(10) Patent No.: US 12,491,467 B1
(45) Date of Patent: Dec. 9, 2025

(54) CARBON CAPTURE SYSTEMS AND METHODS OF USE

(71) Applicant: Provocative Science Holdings, Inc., Somerville, MA (US)

(72) Inventors: Nicholas Meyer, Boston, MA (US); Robert Fisher, Arlington, MA (US); Andrew Bouma, Cambridge, MA (US); Bryan Woodruff, Medford, MA (US); Indrid Xhuti, Watertown, MA (US)

(73) Assignee: Provocative Science Holdings, Inc., Somerville, MA (US)

( * ) Notice: Subject to any disclaimer, the term of this patent is extended or adjusted under 35 U.S.C. 154(b) by 0 days.

(21) Appl. No.: 19/204,954

(22) Filed: May 12, 2025

(51) Int. Cl.
    *B01D 53/04*     (2006.01)
    *B01D 53/62*     (2006.01)

(52) U.S. Cl.
    CPC ..... *B01D 53/0462* (2013.01); *B01D 53/0438* (2013.01); *B01D 2257/504* (2013.01); *B01D 2259/40007* (2013.01); *B01D 2259/40098* (2013.01)

(58) Field of Classification Search
    CPC .. B01D 53/04; B01D 53/047; B01D 53/0476; B01D 53/0462; B01D 53/0438; B01D 2257/504; B01D 2259/40007; B01D 2259/40098
    USPC .......... 423/230; 96/109, 111, 121, 122, 126, 96/143, 146; 95/95, 96, 106, 114, 115, 95/139, 1, 8
See application file for complete search history.

(56) References Cited

U.S. PATENT DOCUMENTS

| | | | | |
|---|---|---|---|---|
| 4,822,383 A | * | 4/1989 | Brose | B01D 53/04 95/139 |
| 5,656,067 A | * | 8/1997 | Watson | B01D 53/053 95/103 |
| 6,322,612 B1 | * | 11/2001 | Sircar | B01D 53/047 95/139 |
| 11,766,636 B1 | * | 9/2023 | Besarati | B01D 53/0462 95/90 |
| 2008/0202339 A1 | * | 8/2008 | Nalette | B01D 53/0476 95/120 |
| 2016/0199808 A1 | * | 7/2016 | Yoshikawa | B01D 53/02 502/406 |

(Continued)

FOREIGN PATENT DOCUMENTS

| | | |
|---|---|---|
| CN | 117504527 A | 2/2024 |
| WO | 2014073004 A2 | 5/2014 |

*Primary Examiner* — Frank M Lawrence, Jr.
(74) *Attorney, Agent, or Firm* — Caldwell Intellectual Property Law

(57) ABSTRACT

A carbon capture system including an air intake system configured to receive a gas including a carbonic substance, at least one carbon capture chamber fluidly connected to the air intake system, the at least one carbon capture chamber including one or more adsorbent and/or absorbent materials, the one or more adsorbent and/or absorbent materials configured to adsorb the carbonic substance from the gas, a desorption system, the desorption system including a heating system configured to apply a heat to the at least one carbon capture chamber and remove the carbonic substance from the one or more adsorbent and/or absorbent materials and a vacuum system configured to extract the carbonic substance from the at least one carbon capture chamber and a compression system configured to compress the carbonic substance.

22 Claims, 8 Drawing Sheets

(56) References Cited

U.S. PATENT DOCUMENTS

| | | | |
|---|---|---|---|
| 2021/0146299 A1* | 5/2021 | Besarati | C25B 15/081 |
| 2023/0073553 A1* | 3/2023 | Holman | B01D 53/06 |
| 2023/0211276 A1 | 7/2023 | Spiteri et al. | |
| 2023/0233986 A1* | 7/2023 | Zanjani | C01B 32/50 |
| | | | 95/220 |
| 2023/0264138 A1* | 8/2023 | McGrail | B01D 53/0438 |
| | | | 95/139 |
| 2024/0189769 A1 | 6/2024 | Elenowitz et al. | |
| 2024/0390850 A1* | 11/2024 | Tan | B01D 53/06 |
| 2025/0074842 A1* | 3/2025 | Beaton | H01M 8/04805 |

* cited by examiner

CARBON CAPTURE SYSTEMS AND METHODS OF USE

FIELD OF THE INVENTION

The present invention generally relates to the field of carbon capture. In particular, the present invention is directed to carbon capture systems and methods of use.

BACKGROUND

Human activities have significantly increased $CO_2$ levels, leading to potential environmental impacts. While renewable energy sources and energy efficiency improvements are crucial, many industries still produce unavoidable emissions. Carbon capture, utilization, and storage technologies help by capturing $CO_2$ at the source or directly from the air, preventing it from contributing to negative environmental impacts. Current systems used to capture $CO_2$ are inefficient and may contribute to an overall increase in $CO_2$ production.

SUMMARY OF THE DISCLOSURE

In an aspect, a carbon capture system is described. The carbon capture includes an air intake system configured to receive a gas including a carbonic substance, at least one carbon capture chamber fluidly connected to the air intake system, the at least one carbon capture chamber including one or more adsorbent and/or absorbent materials, the one or more adsorbent and/or absorbent materials configured to adsorb the carbonic substance from the gas, a desorption system, the desorption system including a heating system configured to apply a heat to the at least one carbon capture chamber and remove the carbonic substance from the one or more adsorbent and/or absorbent materials and a vacuum system configured to extract the carbonic substance from the at least one carbon capture chamber and a compression system configured to compress the carbonic substance.

In another aspect, a method of use for a carbon capture system is described. The method includes receiving a gas including a carbonic substance from an air intake system, capturing the carbonic substance in at least one carbon capture chamber fluidly connected to the air intake system, wherein the at least one carbon capture chamber including one or more adsorbent and/or absorbent materials, the one or more adsorbent and/or absorbent materials configured to adsorb the carbonic substance from the gas, adsorbing the carbonic substance from the gas using the one or more adsorbent and/or absorbent materials within the at least one carbon capture chamber, extracting the carbonic substance from the at least one carbon capture chamber using a desorption system, the desorption system including a heating system configured to apply a heat to the at least one carbon capture chamber and remove the carbonic substance from the one or more adsorbent and/or absorbent materials and a vacuum system configured to extract the carbonic substance from the at least one carbon capture chamber and compressing the carbonic substance into a carbonic liquid using a compression system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for carbon capture. In an aspect, existing carbon capture systems may be de=inefficient due to power requirements needed to blow air through a system. As a result, energy utilized by blowing air through a system may result in an increase in a production of carbon dioxide. In an aspect, the present disclosure includes an intake system configured to receive a gas. The air intake system may be fluidly connected to a data center and/or an existing air ventilation system of a data center in order to harness already existing moving air for a system as described in this disclosure. In one or more embodiments, air intake system may receive flowing air stemming from a data center, such that air intake system may become more efficient by utilizing already flowing air. In aspect, the present disclosure further includes a carbon capture chamber configured to contain the gas, an adsorbent and/or absorbent material configured to adsorb carbonic substances from the gas, a desorption system configured to isolate the carbonic substance and a compression system. In another aspect, the present disclosure includes an air intake system configured to receive air and/or gases.

Aspects of the present disclosure can be used to isolate carbonic substances from gases. Aspects of the present disclosure can also be used to ensure continuous receipt of gasses. This may be so, at least in part, because of the use of multiple carbon capture chambers and a controller controlling the carbonic cycle of each chamber. Exemplary embodiments illustrating aspects of the present disclosure are described below in the context of several specific examples.

Figure 1:
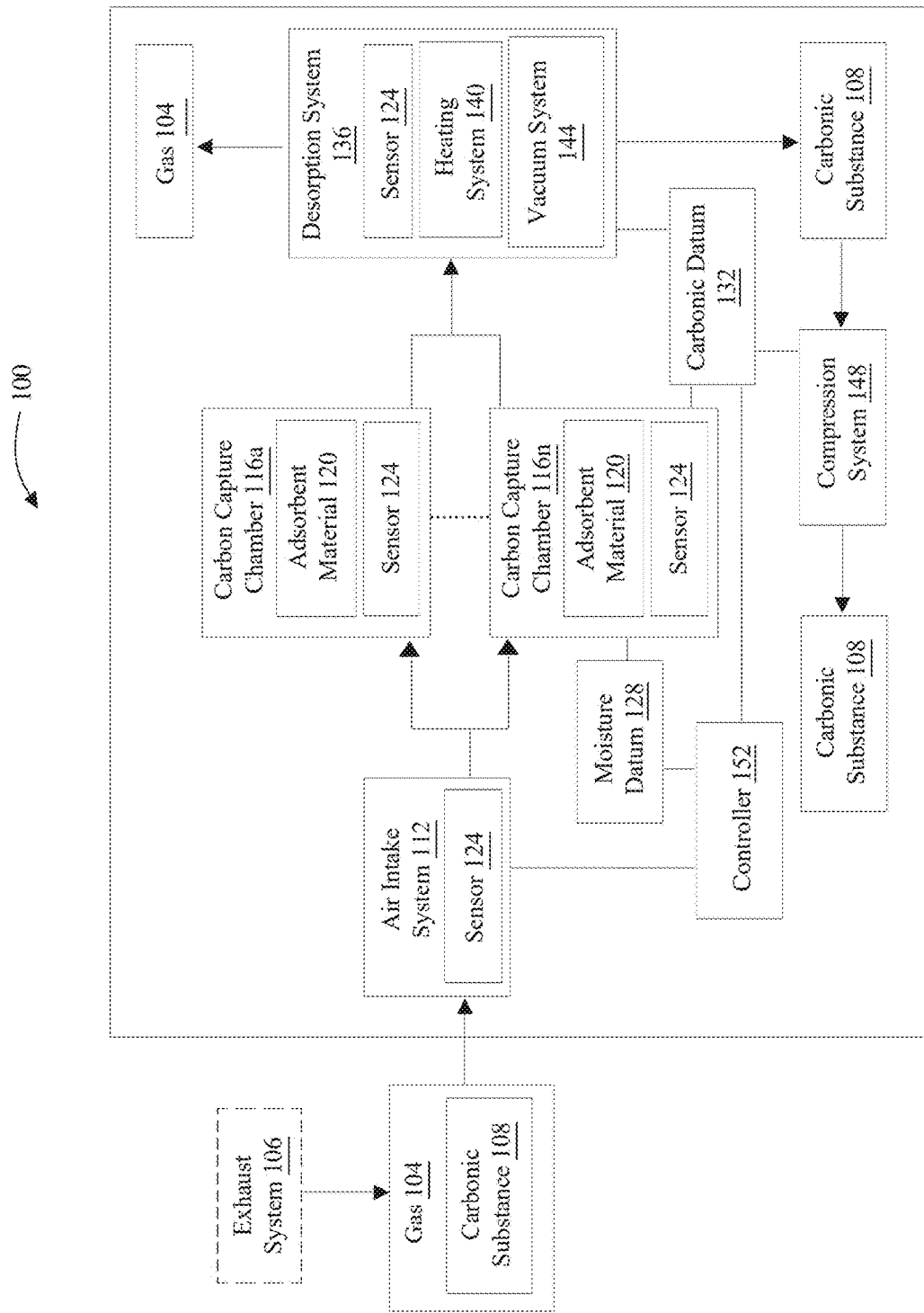
FIG. 1 is a block diagram of an exemplary embodiment of a carbon capture system.

Referring now to FIG. 1, an exemplary embodiment of carbon capture system 100 (hereinafter referred to as "system 100") is described. A "carbon capture system" for the purposes of this disclosure is a device configured to extract $CO_2$ or other carbon-based gases from surrounding air. In one or more embodiments, system 100 may be used to reduce the amount of $CO_2$ from surrounding air. In one or more embodiments, system 100 may be used to filter out $CO_2$ from an exhaust of one or more devices or machines, in order to reduce the amount of carbon being released into the atmosphere. In one or more embodiments, system 100 may be configured to capture air, extract the carbon from the air, and preserve the carbon, while releasing the air into the atmosphere. In one or more embodiments, system 100 may be used to capture carbon that has already been released into the atmosphere. In one or more embodiments, system 100 may include an active carbon capture system. An "active carbon capture system" as described in this disclosure is a system that uses external energy to actively capture carbon and remove carbon dioxide from the air. For example, and without limitation, active carbon capture system may use external energy to flow air through carbon capture system and actively adsorb carbonic substances from the air. In one or more embodiments, a carbon capture system may rely on solutions such as biochar to passively remove carbon from air, whereas active carbon capture systems may actively flow air to an absorbent material and actively cause carbon to be removed from surround air. In one or more embodiments, an active carbon capture system may use fans and/or already existing systems to divert flowing air to a chamber, wherein carbon may be actively removed from the air within the chamber. In one or more embodiments, an active carbon capture system may rely on chemical adsorption or direct air capture using fans and sorbents. In one or more embodiments, an active carbon capture system may rely on external forces to divert air to carbon capture system and forcefully remove carbon from surround air.

With continued reference to FIG. 1, system 100 is configured to receive a gas 104 comprising a carbonic substance 108. In one or more embodiments, gas 104 may include any gaseous substance, such as but not limited to oxygen, nitrogen, Argon, Neon, Helium, Water vapor, Carbon dioxide ($CO_2$), Methane, Nitrous Oxide, Carbon monoxide, ammonia, Ozone, and/or the like. In one or more embodiments, gas 104 may include any elements that may be found in atmospheric air; gas may be composed of atmospheric air. In one or more embodiments, gas 104 may include any element that may be found as a result of a combustion process. In one or more embodiments, gas 104 may include any substances found at an exhaust of a combustion engine. In one or more embodiments, gas 104 may include any gaseous substances that may be suspended in air. In one or more embodiments, gas 104 includes a carbonic substance 108. A "carbonic substance" for the purposes of this disclosure is a substance or material contains carbon or carbon compounds. For example, and without limitation, carbonic substance 108 may include carbon dioxide, carbon monoxide, carbonate and/or any other gaseous substances that may be found in air and/or as a result of a combustion process. In one or more embodiments, carbonic substance 108 may include any material containing carbon that is in a gaseous form under ambient temperature and pressure, such as for example, carbon dioxide, carbon monoxide and/or the like. Other gases and/or particular matter may alternatively or additionally be captured, including any gas or gases present in air, particulates commonly found in air, or the like.

With continued reference to FIG. 1, system 100 includes an air intake system 112. An "air intake system" as described in this disclosure refers to a device used to capture a gas. For example, and without limitation air intake system 112 may capture atmospheric air. In one or more embodiments, air intake system 112 may be configured to receive gas 104 from an exhaust of a combustion process, an output of a combustion process and/or the like. In one or more embodiments, air intake system 112 may be configured to receive air stemming from a cooling tower, air stemming from a data center and/or the like. In one or more embodiments, air intake system 112 may be configured to receive a gas 104 output from a device or system prior to being released into the atmosphere. In one or more embodiments, air intake system 112 may be located in areas of higher concentration of carbonic substances 108 within gas, such as but not limited to, near highways, near roads, near factories, near data centers, near cooling towers, near combustion related power plants and/or the like.

With continued reference to FIG. 1, air intake system 112 may receive gas 104 from an exhaust system. An "exhaust system" for the purposes of this disclosure refers to any device or a component thereof that facilitates the removal of unwanted air. For example, and without limitation, an air conditioning unit may contain an exhaust system that removes air which was initially used to cool down components of the air conditioning unit. In one or more embodiments, exhaust system may be configured to remove unwanted hot air from devices that produce heat. For example, and without limitation, a data center may produce heat, wherein air may be introduced in order to cool down components of the data center. Continuing, data center may include an exhaust system configured to expel the heated air, such that new cooled air may be introduced. In one or more embodiments, exhaust system may include and/or be included within a heat-producing system. A "heat producing system" for the purposes of this disclosure refers to a device or collection of devices that produce heat either directly and/or indirectly. For example, and without limitation, heat-producing system may include a computing device that produces heat as a result of a utilization of the computing device. In one or more embodiments, heat producing system may include a data center containing a plurality of computing devices, an air conditioning unit that expels hot air that was captured, a combustion device such as a vehicle that produces heat as a result of a combustion process and/or the like. In one or more embodiments, heat-producing system may include a ventilation system within a facility that is configured to transport hot air out of the facility. In one or more embodiments, exhaust system may be configured to facilitate the removal of heat from heat producing system by removing air which has been heated by heat-producing system. In one or more embodiments, exhaust system may include a component of a ventilation system within a building, a components of an air cooling system, a components of a cooling system for a data center, server, and/or the like. In one or more embodiments, exhaust system may include a fan configured to remove unwanted air or gases from within an enclosed space. In one or more embodiments, exhaust system may include a duct that allows for unwanted air or gases to be removed from a particular system. For example, and without limitation, a combustion power plant may include an exhaust system that is configured to facilitate the release of carbon dioxide and other gases that have been generated as a product of a combustion process. In one or more embodiments, exhaust system may include a fan or turbine that is capable of expelling unwanted air from a data center, air cooling unit and/or the like into the surrounding atmosphere. In one or more embodiments, exhaust system may include and/or be included in a computing device that produces heat, in an electrically powered device that produces heat and/or the like. In one or more embodiments, a data center and/or server may contain a plurality of computing devices, such as but not limited to central processing units, graphical processing units and/or the like, wherein exhaust system may be configured to remove excess heat generated by the computing devices. In one or more embodiments, a cooling system may supply cool and/or room temperature air to data center, wherein exhaust system may remove the air once it has been used to cool the computing devices. In one or more embodiments, exhaust system may use electrical energy to power a fan and/or turbine in order to expel air.

With continued reference to FIG. 1, carbon capture system 100 may be integrated into an existing heat-producing system such as a data center, air conditioning unit and/or the like, wherein air expelled from the heat-producing system may flow directly into carbon capture system 100. In one or more embodiments, heat-producing system may include exhaust system. In one or more embodiments, exhaust system may be powered with electrical energy, such that exhaust system may flow hot air and/or gases out of heat-producing system. In one or more embodiments, system 100 and/or air intake system 112 may receive heated air and/or gas 104 from exhaust system. In one or more embodiments, air intake system 112 may conserve on energy by utilizing an already flowing gas 104 being expelled from heat producing system. In one or more embodiments, air intake system 112 may be fluidly connected to exhaust system such that gas expelled using exhaust system may flow directly into air intake system 112. In one or more embodiments, air intake system 112 may conserve on energy utilization by receiving already flowing air, rather than utilizing an intake fan and/or turbine to pull air into system 100. In one or more embodiments, air intake system may be situated at an outlet of heat-producing device and/or exhaust system such that air flowing out of heat-producing device may flow directly into air intake system 112. In one or more embodiments, system 100 and/or air intake system 112 may be integrated directly into exhaust system and/or heat-producing device such that air intake system 112 may utilize energy used by exhaust system to expel gas 104 to further receive gas 104 for system 100. In one or more embodiments, exhaust system 106 may be fluidly connected to air intake system 112 wherein gas from exhaust system 106 may flow through air intake system 112. In one or more embodiments, air intake system 112 may be configured to receive gas 104 from exhaust system 106. In one or more embodiments, exhaust system may include and/or be included in an air cooling system. An "Air cooling system" for the purposes of this disclosure refers to a cooling system in which cool or ambient air is used to absorb heat from one or more heat-producing devices. For example, and without limitation, air cooling system may include a fan and/or turbine configured to blow cool and/or ambient air at one or more heat-producing devices in order to absorb heat and thereby reduce a temperature of one or more heat-producing devices. In one or more embodiments, exhaust system may include an air cooling system for a data center. In one or more embodiments, data center may include a facilitate with a plurality of computing devices and/or components, such as but not limited to, central processing units, graphical processing units, network communication devices and/or the like.

With continued reference to FIG. 1, air intake system 112 may be configured to receive and/or capture gas. In one or more embodiments, air intake system 112 may include a turbine configured to cause air to flow into system 100. In one or more embodiments, air intake system 112 may include a fan and/or any other devices configured to provide for air to flow into system 100. In one or more embodiments, air intake system 112 may include air intake ducts. In one or more embodiments, air intake ducts may include large ducts or openings designed to pull in ambient air. In one or more embodiments, air intake ducts may include protective covers, such as grilles and/or mesh in order to prevent and/or minimize debris from entering system 100. In one or more embodiments, air intake system 112 may include filters that only allow for gas 104 to enter system 100 while removing dust, particulates, and/or objects. In one or more embodiments, filters may include HEPA filters and/or electrostatic filters. In one or more embodiment, air intake system 112 may include filters and/or fans to ensure a steady flow of air and/or gas 104 into system 100. In one or more embodiments, air intake system 112 may include flow control valves and/or dampers in order to regulate the volume of air entering system 100. In one or more embodiments, air intake system 112 may include flow control valves to control a direction of gas. In one or more embodiments, gas 104 may flow into one or more portions of system 100. In one or more embodiments, air intake system 112 may include flow control valves to control a direction of gas 104 into system 100. In one or more embodiments, air intake system 112 may contain motors and/or solenoid valves that are configured to control a flow of gas 104 into system 100. In one or more embodiments, the flow of gas 104 may be controlled using a computing device or controller 152 as described in further detail below. In one or more embodiments, air intake system 112 may be positioned at an outlet of a differing system already containing a flowing gas. For example, and without limitation, an exhaust engine may contain already flowing gas, wherein air intake system 112 may be positioned near the exhaust in order to capture the flowing gas, without the use of a motor or fan. In one or more embodiments, air intake system 112 may be positioned at an outlet of a cooling tower in order to take advantage of the flow of air escaping the cooling tower. In one or more embodiments, air intake system 112 may include flow control valves that allow for the flow of gas 104 into system 100, but not out of system 100. In one or more embodiments, flow control valve may be configured to prevent backflow of gas 104 from system 100 and back through air intake system 112. In one or more embodiments, flow control valve may ensure that gas 104 travels in a singular direction into system 100.

With continued reference to FIG. 1, as used in this disclosure, a "valve" is a component that controls fluidic communication between two or more components. Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device and/or controller 152. Computing device may be in communication with valve, for example by way of one or more of electrical communication, hydraulic communication, pneumatic communication, mechanical communication, and the like. In some cases, controller 152 may be in communication with one or more components (e.g., valve, pump, sensors, and the like) by way of one or more networks, including for example wireless networks and controller 152 area networks (CANs).

With continued reference to FIG. 1, system 100 includes at least one carbon capture chamber 116a-n. A "carbon capture chamber" for the purposes of this disclosure is a structure designed to capture and contain a gas. For example, and without limitation, carbon capture chamber 116a-n may include a container that is configured to contain gas. In one or more embodiments, carbon capture chamber 116a-n may include a cylindrical container, a spherical container, a rectangular container, or the like. In one or more embodiments, the container may contain hollow portions to allow for the receipt and containment of gas. In one or more embodiments, air intake system 112 may be fluidly connected to carbon capture chamber 116a-n in order to provide gas 104 to carbon capture chamber 116a-n. "Fluidly connected" and/or a "fluid connection" as described in this disclosure refers to a connection between two components in which a gas 104 or other fluid like substance may travel between the two components. For example, and without limitation, air intake system 112 may be fluidly connected to carbon capture chamber 116a-n through the use of a tube, wherein gas 104 may pass through tube and into carbon capture chamber 116a-n. In one or more embodiments, air intake system 112 may be fluidly connected to carbon capture chamber 116a-n, wherein carbon capture chamber 116a-n may be configured to receive gas 104 from air intake system 112. In one or more embodiments, carbon capture chamber 116a-n may be fluidly connected to air intake system 112 through the use of one-way valves and/or pressure-controlled valves that allow for air to enter carbon capture chamber 116a-n but not escape. In one or more embodiments, carbon capture chamber 116a-n may be sealed in order to ensure that gas 104 does not escape. In one or more embodiments, carbon capture chamber 116a-n may contain designed inlets and outlets in which gas 104 may escape. In one or more embodiments, the designed inlets and/or outlets may contain valves that prevent the unwanted escape of gas. In one or more embodiments, carbon capture chamber 116a-n may initially contain a negative pressure differential in comparison to surrounding air in order to ensure that gas 104 enters carbon capture chamber 116a-n. In one or more embodiments, control capture chamber may contain control valves that control the intake and release of gas, wherein gas 104 may be preserved within control chamber until control valves are activated to allow for the release of gas.

With continued reference to FIG. 1, carbon capture chamber 116a-n includes one or more adsorbent and/or absorbent materials. An "adsorbent and/or absorbent material" for the purposes of this disclosure is a material that capable of trapping molecules such as carbon dioxide or water vapor. In one or more embodiments, adsorbent and/or absorbent material 120 may capture or trap molecules through a process called adsorption. "Adsorption" or the process of "adsorbing" for the purposes of this disclosure refers to a process in which molecules, ions or atoms stick to a surface of another molecule. In one or more embodiments, during adsorption, molecules from a gas 104 or liquid come into contact with an adsorbent and/or absorbent surface, such as adsorbent and/or absorbent material 120. Weak van der Waals forces or chemical bonds cause the molecules to adhere to the surface of the adsorbent and/or absorbent material 120. in one or more embodiments, molecules may adhere to a surface of a material without penetrating it. In one or more embodiments, adsorption may be contrasted with absorption, wherein absorption includes a process in which molecules penetrate the material. In one or more embodiments, adsorbent and/or absorbent materials may include materials capable of trapping and holding molecules on the surface of the adsorbent and/or absorbent materials. In one or more embodiments, adsorbent and/or absorbent materials may include but are not limited to Zeolites, activated carbon, Chitosan, Amine-functionalized sorbents, Silica gel, porous silicates, Metal-Organic Frameworks, Covalent organic frameworks amine-based sorbets, metal oxides, lithium silicates, Sodium zirconates and/or the like. In one or more embodiments, metal organic frameworks may use crystalline materials made from metal ions (like zinc, copper, or iron) connected by organic linkers (molecules with carbon atoms). In one or more embodiments, the pores in metal organic frameworks (MOF) can be fine-tuned to selectively adsorb $CO_2$ over other gases. Some MOFs MAY BE efficient at grabbing $CO_2$ even at low concentrations (like those found in the atmosphere or industrial exhaust). In one or more embodiments, covalent organic frameworks (COFs) may be built entirely from light elements (like carbon, hydrogen, nitrogen, oxygen, boron) connected by strong covalent bonds. Similar to MOFs, COFs can be designed to selectively capture $CO_2$. In one or more embodiments, adsorbent and/or absorbent materials may contain chemical properties that allow for carbonic substance 108 within gas 104 to adhere to a surface of adsorbent and/or absorbent material 120. In one or more embodiments, adsorbent and/or absorbent material 120 may contain chemical properties that allow for carbonic substance 108 to be separated from gas 104 through a process of adsorption. In one or more embodiments, adsorbent and/or absorbent material 120 may contain amines that chemically bond with carbon dioxide. In one or more embodiments, adsorbent and/or absorbent material 120 may contain molecular sized pores that trap carbon dioxide. In one or more embodiments, adsorbent and/or absorbent material 120 may adsorb carbonic substances 108 through physical adsorption. In one or more embodiments, physical adsorption or "physisorption" includes a process in adsorbent and/or absorbent materials rely on high surface area and porous structures to trap carbonic substances 108. In one or more embodiments, adsorbent and/or absorbent materials may contain a microporous structure that is used to capture carbonic substances 108. In one or more embodiments, physisorption may contain weak van der Waals forces between carbonic substances 108 and adsorbent and/or absorbent materials in order to allow for reuse of adsorbent and/or absorbent materials. In one or more embodiments, weak forces may allow for a system to trap carbonic substances 108 using adsorbent and/or absorbent materials and remove the carbonic substances 108 form the adsorbent and/or absorbent materials when desired.

With continued reference to FIG. 1, adsorbent and/or absorbent material 120 may include a material body with an adsorbent and/or absorbent coating. In one or more embodiments, the material body may provide the structure for adsorbent and/or absorbent material 120. In one or more embodiments, material body may include a materials, such as stainless steel, aluminum alloys, ceramic materials, such as silicon carbide and/or alumina, Polymeric materials such as polyamides and polysulfides and/or the like. In one or more embodiments, adsorbent and/or absorbent coating may provide the adsorbent and/or absorbent properties for adsorbent and/or absorbent material 120. In one or more embodiments, adsorbent and/or absorbent coating may cover a surface of material body. In one or more embodiments, adsorbent and/or absorbent coating may include Zeolites, activated carbon, amines and/or other materials as described above. In one or more embodiments, adsorbent and/or absorbent coating may provide adsorbent and/or absorbent properties for adsorbent and/or absorbent material 120. In one or more embodiments, material body may provide for structural properties of adsorbent and/or absorbent material 120, such as for example, a shape, a heat transfer coefficient, and/or the like. In one or more embodiments, material body may contain physical properties capable of heat transfer. For example, and without limitation, material body may include metals with high heat transfer coefficients in order to modify a temperature of adsorbent and/or absorbent material 120. In one or more embodiments, adsorbent and/or absorbent material 120 may contain a shape, such as for example, a planar sheet, a cylindrical tube, and/or the like. In one or more embodiments, adsorbent and/or absorbent material 120 may contain a carbon capture tube. A "carbon capture tube" for the purposes of this disclosure in an adsorbent and/or absorbent material 120 containing a cylindrical structure with thermally conductive properties suitable for heat transfer. A material is said to have "thermally conductive properties as described in this disclosure if it contains the ability to conduct heat. In one or more embodiments, a material with thermally conductive properties may include a material with a thermal conductive of 10 (W/m·K) or greater. In one or more embodiments, materials with thermally conductive properties may include aluminum, copper, stainless steel, silver, graphite, metals, and/or the like. In one or more embodiments, carbon capture tube may contain thermally conductive properties, wherein for example, carbon capture tube may contain a material body made of aluminum, steel, and/or the like. In one or more embodiments, carbon capture tube may include a cylindrical tube in which adsorbent and/or absorbent material is coated on an inner and/or outer surface of the cylindrical tube. In one or more embodiments, adsorbent and/or absorbent material 120 may be coated on an inner surface of the cylindrical tube, wherein gas 104 may pass through an interior of the tube and carbonic substances 108 may be adsorbed by the coating. In one or more embodiments, carbon capture tubes may ensure increased contact with gas 104 to a surface area of carbon capture tubes. In one or more embodiments, gas 104 may travel in a direction of and through an interior of carbon capture tubes.

In one or more embodiments, carbon capture system 100 may capture or trap gas molecules, such as carbonic substances through a process called "electrochemical carbon capture". "Electrochemical carbon capture", for the purpose of this disclosure, is a process that uses electron transfer reaction to drive carbon dioxide separation for gas. In one or more embodiments, electrochemical carbon capture may include an electrochemical cell configured to generate acid/base pairs to control pH in solution, wherein at a relatively high pH carbon dioxide may be captured as bicarbonate or carbonate, and at a relatively low pH, carbon dioxide may be released as a gas. In one or more embodiments, electrochemical carbon capture may include applying a voltage between two electrodes (anode and cathode) in an electrochemical cell that drives redox reactions, wherein the reaction may either consume or generate protons (H+) or hydroxide ions (OH—) which can modify the local pH of the system. In one or more embodiments, a basic environment in electrochemical carbon capture system may be used for carbon dioxide capture and an acidic environment may be used for carbon dioxide release. In one or more embodiments, voltage generated from the electrochemical carbon capture may adjust pH through electron flow. In one or more embodiments, adjusting pH in one or more carbon capture material may include chemical adjustment by adding chemicals like addition of acids and bases to drive carbon dioxide capture. In one or more embodiments, electrochemical carbon capture may include electrochemically mediated amine regeneration, wherein amines may form carbamates with carbon dioxide in solution and a metal ion (e.g., Cu2+) may be electrochemically generated to displace carbon dioxide from the amine and allow regeneration without thermal input. In one or more embodiments, electrochemical carbon capture may include an electrochemical cell with an ion-exchange or bipolar membrane configured to separate acidic and basic regions, wherein carbon dioxide may be adsorbed and transported across the membrane via charged carbonate/bicarbonate species and may be released through local pH changes. In one or more embodiments, electrochemical carbon capture may include a faradaic electro swing adsorption process, wherein solid sorbents coated with redox-active functional groups may adsorb carbon dioxide under one electric potential and release it under another.

With continued reference to FIG. 1, system 100 may include more than one carbon capture chamber 116*a-n*, wherein each carbon capture chamber 116*a-n* contains one or more adsorbent and/or absorbent materials. In one or more embodiments, each carbon capture chamber 116*a-n* may contain one or more carbon capture tubes to ensure continuous receipt of gas. In one or more embodiments, system 100 may be configured to receive gas 104 and trap gas 104 within carbon capture chamber 116*a-n*. In one or more embodiments, once gas 104 is trapped within carbon capture chamber 116*a-n* and/or once carbon capture has reached a maximum capacity for gas 104 and/or carbonic substances 108, carbon capture may cease a receipt of gas. In one or more embodiments, a maximum capacity of carbon capture chamber 116*a-n* may be reached when adsorbent and/or absorbent materials within carbon capture chamber 116*a-n* can no longer adsorb carbonic substances 108. In one or more embodiments, system 100 may include more than one carbon capture chambers in order to ensure continuous receipt of gas. In one or more embodiments, system 100 may be configured to alternate between carbon capture chambers, wherein system 100 may be configured to alternate between carbon capture chambers once a particular carbon capture chamber 116*a-n* has reached a maximum capacity. In one or more embodiments, flow valves of air intake system 112 may reroute gas 104 to differing carbon capture chambers, such as for example, from a first carbon capture chamber to a second carbon capture chamber. In one or more embodiments, the system 100 may include a first carbon capture chamber, a second carbon capture, wherein the first carbon capture chamber and the second carbon capture are configured to provide a continuous receipt of gas. In one or more embodiments, system 100 may include a plurality of carbon capture chambers, wherein system 100 may alternate between carbon capture chambers based on their ability to adsorb carbonic substances 108. This will be described in further detail below.

With continued reference to FIG. 1, carbon capture chamber 116*a-n* may include an outlet valve. An "Outlet valve" for the purposes of this disclosure is a valve configured to allow for gas 104 to be released from carbon capture chamber 116*a-n*. In one or more embodiments, carbon capture chamber 116*a-n* may include an inlet valve that allows for gas 104 to enter carbon capture chamber 116*a-n* and an outlet valve that allows for gas 104 to be released from carbon capture chamber 116*a-n*. In one or more embodiments, inlet valve and outlet valve may be located on opposing ends of carbon capture chamber 116*a-n*. In one or more embodiments, gas 104 may enter through inlet valve at one end of carbon capture chamber 116*a-n* and exit through outlet valve of carbon capture chamber 116a-n. In one or more embodiments, adsorbent and/or absorbent materials may be situated between inlet valve and outlet valve. In one or more embodiments, gas 104 may enter through inlet valve, pass through adsorbent and/or absorbent materials and exit through outlet valve. In one or more embodiments, gas 104 may pass through adsorbent and/or absorbent materials, wherein carbonic substances 108 within gas 104 may be adsorbed by adsorbent and/or absorbent material 120. In one or more embodiments, gas 104 may travel through carbon capture tubes and out through outlet valve. In one or more embodiments, gas 104 may lack carbonic substance 108 when escaping through outlet valve. In one or more embodiments, gas 104 may initially contain carbonic substance 108, wherein carbonic substance 108 may be adsorbed by adsorbent and/or absorbent material 120 and kept within carbon capture chamber 116a-n, while gas 104 exits through outlet valve. In one or more embodiments, gas 104 may pass through carbon capture chamber 116a-n until adsorbent and/or absorbent materials are fully saturated with carbonic substances 108. Once adsorbent and/or absorbent materials are fully saturated, system 100 may be configured to cease the flow of gas 104 within carbon capture chamber 116a-n and route the flow of gas 104 to another carbon capture chamber 116a-n. This will be described in further detail below.

In one or more embodiments, inlet valve and/or outlet valve may be controlled in order to allow for receipt of gas. In one or more embodiments, once adsorbent and/or absorbent materials have reached a maximum saturation level (wherein a maximum saturation level is determined based on an ability of adsorbent and/or absorbent materials to continue to adsorb carbonic substances 108) inlet valve and outlet valve may isolate chamber and prevent the receipt or exit of gas. In one or more embodiments, inlet valve and outlet valve may prevent escape or entrance of gas, wherein carbon capture chamber 116a-n may act as a closed container capable of pressurization. In one or more embodiments, carbon capture chamber 116a-n may contain an ambient pressure, wherein the ambient pressure is defined as the pressure of the surrounding air outside of carbon capture chamber 116a-n (e.g., 1 atm). In one or more embodiments, carbon capture may contain residual gas 104 that has not exited carbon capture chamber 116a-n. In one or more embodiments, residual gas 104 may be removed through the use of a vacuum such as any vacuum as described in this disclosure.

With continued reference to FIG. 1, carbon capture chamber 116a-n may include one or more sensors. Sensor 124 may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal such as a voltage with respect to a reference. Sensor 124 may detect a plurality of data. A plurality of data detected by sensor 124 may include, but is not limited to pressure, temperature, carbon saturation, oxygen saturation and/or the like. In one or more embodiments, and without limitation, sensor 124 may include a plurality of sensors. In one or more embodiments, and without limitation, sensor 124 may include an optical or image sensor such as a camera, a CMOS detector, a CCD detector, a video camera, a photodiode, a photovoltaic cell, a photoconductive device, a thermal and/or infrared camera, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas 104 and chemical sensors, flame sensors, electrical sensors, imaging sensors, force sensors, Hall sensors, and the like. Sensor 124 may be a contact or a non-contact sensor. Signals may include electrical, electromagnetic, visual, audio, radio waves, or another undisclosed signal type alone or in combination.

With continued reference to FIG. 1, sensor 124 may include a plurality of independent sensors, where any number of the described sensors may be used to detect any number of physical or thermal qualities associated with carbon capture chamber 116a-n. Independent sensors may include separate sensors measuring physical or thermal quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 124 to detect phenomenon may be maintained.

With continued reference to FIG. 1, sensor 124 may include a pressure sensor. A "pressure," for the purposes of this disclosure, and as would be appreciated by someone of ordinary skill in the art, is a measure of force required to stop a fluid from expanding and is usually stated in terms of force per unit area. In non-limiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, a pressure sensor may be configured to transform a pressure into an analogue electrical signal. In some embodiments, the pressure sensor may be configured to transform a pressure into a digital signal.

With continued reference to FIG. 1, sensor 124 may include a moisture sensor. "Moisture," as used in this disclosure, is the presence of water, which may include vaporized water in air, condensation on the surfaces of objects, or concentrations of liquid water. Moisture may include humidity. "Humidity," as used in this disclosure, is the property of a gaseous medium (almost always air) to hold water in the form of vapor. In an embodiment, a moisture sensor may include a hygrometer. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. Humidity sensor may be psychrometer. Humidity sensor may be a hygrometer. Humidity sensor may be configured to act as or include a humidistat. A "humidistat," for the purposes of this disclosure, is a humidity-triggered switch, often used to control another electronic device. Humidity sensor may use capacitance to measure relative humidity and include in itself, or as an external component, include a device to convert relative humidity measurements to absolute humidity measurements.

With continued reference to FIG. 1, sensor may include a moisture sensor. In one or more embodiments, carbon capture chamber 116a-n may include moisture sensor configured to measure moisture datum 128 of at least one carbon capture chamber 116a-n. A "moisture datum" for the purposes of this disclosure is information associated with the moisture within carbon capture chamber 116a-n. In one or more embodiments, moisture datum 128 may be used to identify the presence of water molecules within carbon capture chamber 116a-n during adsorption of carbonic substances 108. In one or more embodiments, during adsorption, water molecules may attach and/or adsorb to adsorbent and/or absorbent material 120 and/or other portions of carbon capture chamber 116a-n. In one or more embodiments, moisture sensor may be configured to sense and/or generate moisture datum 128 by identifying the amount of moisture within carbon capture chamber 116a-n.

With continued reference to FIG. 1, sensor 124 may include thermocouples, thermistors, thermometers, infrared sensors, resistance temperature detectors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 124, may be measured in Fahrenheit (° F.), Celsius (° C.), kelvin (K), Rankine (° R), or another scale alone or in combination. The temperature measured by sensors may comprise electrical signals, which are transmitted to their appropriate destination wireless or through a wired connection.

With continued reference to FIG. 1, sensor 124 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas 104 detectors, and the like. Sensor 124 may be configured to detect a plurality of data, as discussed further below in this disclosure. A plurality of data may be detected from sensor 124.

With continued reference to FIG. 1, sensor 124 may include a sensor suite which may include a plurality of sensors that may detect similar or unique phenomena. For example, in a non-limiting embodiment, a sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or thermal quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, sensor 124 is configured to transmit a sensor output signal representative of sensed information. As used in this disclosure, a "sensor signal" is a representation of a sensed information that sensor 124 may generate. A sensor signal may include any signal form described in this disclosure, for example digital, analog, optical, electrical, fluidic, and the like. In some cases, a sensor, a circuit, and/or a controller 152 may perform one or more signal processing steps on a signal. For instance, sensor, circuit, and/or controller 152 may analyze, modify, and/or synthesize a signal in order to improve the signal, for instance by improving transmission, storage efficiency, or signal to noise ratio.

With continued reference to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued, and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, sensor 124 may include a nondispersive infrared sensor configured to measure a concentration of the carbonic substance 108 in the first carbon capture chamber and the second carbon capture chamber. A "nondispersive infrared sensor" for the purposes of this disclosure is sensor that that can measure the concentration of gas 104 using infrared absorption. The nondispersive infrared sensor may contain an infrared light source that emits a broad spectrum of infrared light. Differing gases, within the carbon capture chamber 116*a-n* may absorb the infrared light at specific wavelengths. For example, and without limitation, carbon dioxide may absorb infrared radiation at around 4.26 micrometers. In one or more embodiments, nondispersive infrared sensor may use optical filters to only allow infrared light at wavelength associated with the gas 104 to measured (e.g. carbon dioxide at 4./26 microns). In one or more embodiments, the infrared detector may measure how much infrared light passes through the sample, wherein lass transmitted light may indicate higher carbon dioxide concentration. In one or more embodiments, nondispersive infrared sensor may be used to measure a concentration of carbonic substance 108 with carbon capture chamber 116*a-n*. In one or more embodiments, nondispersive infrared sensor configured to measure a concentration of the carbonic substance 108 in each carbon capture chamber 116*a-n*, such as for example, the first carbon capture chamber and the second carbon capture chamber.

With continued reference to FIG. 1, carbon capture chamber 116*a-n* may include a plurality of sensors configured to receive a carbonic datum 132. A "carbonic datum" for the purposes of this disclosure refers to information associated with a particular carbon capture chamber 116*a-n*. For example, and without limitation, carbonic datum 132 may include a temperature, pressure, oxygen saturation level, carbonic substance 108 saturation level, carbon dioxide saturation level and/or the like. In one or more embodiments, each carbon capture chamber 116*a-n* may contain a plurality of sensors, wherein each carbon capture chamber 116*a-n* is configured to produce a separate carbonic datum 132. For example, without limitation, a plurality of sensors may be located in a first carbon capture chamber and a second carbon capture chamber, wherein the plurality of sensors is configured to generate a carbonic datum 132 for each carbon capture chamber 116*a-n*. In one or more embodiments, a controller 152 as described in further detail below may be configured to receive carbonic datum 132 and make one or more determinations.

With continued reference to FIG. 1, system 100 includes a desorption system 136. A "Desorption system" for the purposes of this disclosure is a device configured to separate carbonic substance 108 from adsorbent and/or absorbent material 120. In one or more embodiments, gas 104 may pass through carbon capture chamber 116*a-n*, wherein carbonic substance 108 may adhere and/or adsorb to adsorbent and/or absorbent material 120. In one or more embodiments, once, adsorbent and/or absorbent material 120 is saturated, desorption system 136 may be used to separate and/or remove carbonic substance 108 from adsorbent and/or absorbent material 120. In one or more embodiments, desorption system 136 may allow for adsorbent and/or absorbent material to be reused and re-saturated. In one or more embodiments, desorption system 136 may allow for reuse wherein adsorbent and/or absorbent material 120 may be restarted following a subsequent cycle of receiving gas.

With continued reference to FIG. 1, desorption system 136 includes a heating system 140. A "heating system" for the purposes of the disclosure refers to a device or component capable of producing heat. In one or more embodiments, heating systems 140 may supply heat through electrical resistance, through the use of steam, through hot water or thermal oil, through radiant or infrared heat, through microwave radiation through conductive heating and/or the like. In one or more embodiments, heating system 140 may include any device capable of producing heat, such as for example, a convection heater, a water boiler, an oven, a heat lamp and/or the like. In one or more embodiments, heating system 140 may apply a heat to carbon capture chamber 116*a-n*. In one or more embodiments, applying a heat to carbon capture chamber 116*a-n* may result in one or more components and/or gaseous substances within carbon capture chamber 116*a-n* to increase in temperature. In one or more embodiments, heating system 140 may be configured to provide heat through convection heating, radiative heating, conduction and/or the like. In one or more embodiments, heating system 140 may include a heat exchanger. A "heat exchanger" for the purposes of this disclosure is a system configured to transfer heat from a fluid to another fluid without direction contact. For example, without limitation heat exchanger may include a device that transfers heat from a hot liquid such as water to gas 104 or carbonic substance 108. In one or more embodiments, a fluid may absorb a heat from heat exchanger and thereby cause the fluid to be heated. In one or more embodiments, heat exchanger may include a solid barrier, wherein a heated fluid may transfer heat to a solid barrier and the non-heated fluid may receive the heat from the solid barrier. In one or more embodiments, heat exchanger may contact a surface of adsorbent and/or absorbent material 120 and/or an outer surface of carbon capture tubes, wherein a heated fluid may contact surface of adsorbent and/or absorbent material 120 and transfer heat to adsorbent and/or absorbent material 120. In one or more embodiments, heat exchanger may heat carbonic substance 108 by applying a heat to adsorbent and/or absorbent material 120. In one or more embodiments, adsorbent and/or absorbent material 120 may have a higher thermal conductivity, wherein adsorbent and/or absorbent material 120 may be capable of conducting heat. In one or more embodiments, in a heat exchanger, heat moves through a solid barrier, such as through or around tubular piping, wherein heat exchanger may transfer heat onto adsorbent and/or absorbent materials. In one or more embodiments, gas 104 may travel through inner surface of adsorbent and/or absorbent material 120, wherein heat exchanger may contact an outer surface of adsorbent and/or absorbent material 120 and apply a heat to adsorbent and/or absorbent material 120. In one or more embodiments, heat exchanger may include a heat pump configured to heat a fluid. In one or more embodiments, the heat pump may facilitate the movement of the heated fluid through piping and/or channels. In one or more embodiments, the piping and/or channels may contact adsorbent and/or absorbent material 120 in order to transfer heat to adsorbent and/or absorbent material 120. In one or more embodiments, heat exchanger may engage in a temperature swing adsorption (TSA) process wherein a heat applied to adsorbent and/or absorbent material 120 may cause carbonic substance 108 to detach from adsorbent and/or absorbent material 120. IN oner or more embodiments, heat exchanger may contact thermally conductive materials within carbon capture chamber 116*a-n*, wherein heat exchanger may apply a heat to the thermally conductive materials and thereby apply a heat to carbon capture chamber 116*a-n*. In one or more embodiments, heated fluid may be iteratively recirculated through heat pump to apply additional heat to heated fluid wherein heated fluid may transfer heat to carbon capture chamber 116*a-n*. In one or more embodiments, heat exchanger may contact an outer surface of adsorbent and/or absorbent material 120, such as carbon capture tube in order to transfer heat to an interior surface of adsorbent and/or absorbent material 120. In one or more embodiments, heat exchanger may provide heat through a conduction process. In one or more embodiments, a conduction process is a process by which heat transfers through a solid material from a hotter region to a cooler region without the movement of the material itself. For example, and without limitation, heat exchanger may transfer heat through adsorbent and/or absorbent material 120 and/or a material separating heat exchanger and adsorbent and/or absorbent material 120. In one or more embodiments, a heated fluid may heat a thermally conductive material wherein the heat may be transferred to adsorbent and/or absorbent material 120. In one or more embodiments, in shell-and-tube or plate heat exchangers, hot and cold fluids are separated by a solid metal barrier. In one or more embodiments, in thermal swing adsorption (TSA), heat exchangers warm up adsorbent and/or absorbent materials (zeolites, MOFs, amines) to release captured carbon dioxide and/or carbonic substances 108. Heat is conducted through the walls of heat exchanger tubes to the adsorbent and/or absorbent material 120 (e.g., carbon capture tube). The faster and more efficiently heat conducts, the less energy is needed for $CO_2$ desorption. In one or more embodiments, the heating system 140 includes a heat exchanger containing a fluid, wherein the fluid is configured to provide the heat to the at least one carbon capture chamber 116a-n through a conduction process.

With continued reference to FIG. 1, it may be the case that gas 104 contains a gas that is heated and/or at a high temperature. In one or more embodiments, gas may have been expelled from a data center, such as any data center as described in this disclosure. In one or more embodiments, a heat pump, such as heating system 140 may be used to extract residual heat from gas 104 after it has passed through the servers, then storing that thermal energy in a hot water tank, essentially functioning as a thermal battery. This stored heat could then be repurposed for building heating or other industrial processes, reducing the need for fossil fuel-based heating. Alternatively or additionally, carbon capture system 100 may use and/or communicate with water-cooled systems that allow for direct heat extraction from chips in computing devices within a datacenter, such as with water-cooled or liquid-cooled computing devices and/or servers. For instance, and without limitation, fluids containing waste heat from computing devices, servers, and the like may be pumped or otherwise may flow to a heat exchanger that deposits heat energy and/or heated liquid into a hot water storage tank or other heat-storage component, from which hot water for use in vacuum chambers and the like may be received by system; hot water that has been used to heat carbon capture materials may be run through the same heat exchanger again to gain heat for storage in the heat-storage component once more. Alternatively or additionally, hot water from water-cooled datacenters and/or computing devices may be used directly to heat carbon capture materials. Either water from heat storage tank or water from liquid-cooled data centers and/or computing devices may be further heated using a heating element to achieve a desired or useful temperature for use in releasing carbon dioxide or other materials from carbon capture substances. In one or more embodiments, carbon capture system 100 may include a heat pump system or the like that that interfaces with a data center's air handling infrastructure. As hot air exits the server racks, the heat pump may extract thermal energy from the air stream (e.g. gas 104) and transfer it to a working fluid. This heat may then be transferred via a heat exchanger into a hot water storage tank, where it is retained for later use. In air-cooled systems, ductwork and fans guide the warm exhaust air through the heat pump unit. In water-cooled systems, thermal energy may be captured more directly by circulating water or another coolant through cold plates or heat sinks attached to the chips. The heated fluid is then routed to a heat exchanger, where the energy is again transferred to the hot water tank. In one or more embodiments, gas 104 may enter air intake system, wherein carbon capture system 100 may be configured to extract heat from gas through the use of heat exchangers. In one or more embodiments, heat exchangers may be used to heat a fluid such as a refrigerant and hold heat for use within heating system 140 and/or other components of carbon capture system 100.

With continued reference to FIG. 1, application of a heat to carbon capture chamber 116a-n will result in carbonic substances 108 detaching from adsorbent and/or absorbent material 120 and being released into surrounding air within carbon capture chamber 116a-n. In one or more embodiments, carbonic substances 108 may be released in a gas 104 form and float within carbon capture chamber 116a-n. In one or more embodiments, application of a heat may result in the release of carbonic substance 108 into carbon capture chamber 116a-n. In one or more embodiments, surrounding air within carbon capture chamber 116a-n may become saturated with carbonic substance 108. In one or more embodiments, application of a heat disrupts interactions between the carbonic substance 108 and the adsorbent and/or absorbent material 120. In one or more embodiments, in physical adsorption, carbonic substances 108 are held by weak Van der Waals forces, wherein a heat applied my increase molecular motion and overcome the forces.

With continued reference to FIG. 1, Desorption system 136 further includes a vacuum system. "A vacuum system" for the purposes of this disclosure refers to one or more vacuum pumps that are used to extract substances from carbon capture chamber 116a-n. For example, and without limitation, vacuum system 144 may include a first vacuum configured to remove a first substance (e.g. gas) from carbon capture chamber 116a-n and a second vacuum configured to remove a second substance (e.g. carbonic substance 108) from carbon capture chamber 116a-n. In one or more embodiments, dual stage vacuum system may include two or more vacuum pumps, wherein a first vacuum pump may be used to pressurize carbon capture chamber 116a-n to a first pressure and a second vacuum pump is used to pressurize carbon capture chamber 116a-n to a second pressure. In one or more embodiments, prior to heating, a first vacuum may be used to remove gas 104 such as oxygen and nitrogen from carbon capture chamber 116a-n, wherein carbon capture chamber 116a-n contains a vacuum with carbonic substance 108 adhered to adsorbent and/or absorbent material 120. In one or more embodiments, a second vacuum may then be used to pressurize and/or remove carbonic substance 108 after carbonic substance 108 has been released from adsorbent and/or absorbent material 120. In one or more embodiments, second vacuum may be used to pressurize carbonic substance 108 into a liquid in order to decrease a volume of carbonic substance 108. In one or more embodiments, vacuum system 144 may be configured to initially remove a gas 104 from carbon capture chamber 116a-n, wherein a heat is then applied to remove carbonic substance 108 from adsorbent and/or absorbent material 120, in which a second vacuum is applied to remove the isolated carbonic substance 108. In one or more embodiments, vacuum system 144 may include a first stage, wherein a first vacuum is utilized and a second stage wherein a second vacuum is utilized. In one or more embodiments, in a first stage gas 104 may be removed from carbon capture chamber 116a-n. In one or more embodiments, in a second stage carbonic substance 108 may be removed from carbon capture chamber 116a-n. In one or more embodiments, vacuum system 144 may be used to isolate carbonic substance 108 by initially removing gas 104 from chamber and subsequently removing carbonic substance 108 from carbon capture chamber 116a-n.

In one or more embodiments, vacuum system 144 may operate at two different times or steps during a carbon capture cycle. In one or more embodiments, a first stage of the vacuum system 144 may occur prior to heating of carbon capture chamber 116a-n, wherein gas 104 may be removed. A second stage of the vacuum system 144 may occur after heating, wherein carbonic substance 108 has been removed from adsorbent and/or absorbent material 120. In one or more embodiments, system 100 may employ a preheating process prior to first stage, wherein the preheating process may partially heat up carbon capture chamber 116a-n in order to vaporize water moisture present within carbon capture chamber 116a-n. In one or more embodiments, following preheating, a first vacuum may be used to extract gas, including water vapor from carbon capture chamber 116a-n. In one or more embodiments, prior to second stage, carbon capture may be heated to a higher temperate in order to remove carbonic substance 108 from adsorbent and/or absorbent material 120. In one or more embodiments, during second stage, a second vacuum is used to extract carbonic substance 108 from carbon capture chamber 116a-n. In one or more embodiments, second vacuum may extract a gaseous substance that contains a high concentration of carbonic substances 108. In one or more embodiments, a high concentration may include a concentration of carbonic substances 108 higher than an initial concentration of carbonic substance 108 within gas. In one or more embodiments, vacuum system 144 include a first vacuum configured to isolate the carbonic substance 108 by removing the gas 104 from the at least one carbon capture chamber 116a-n and a second vacuum configured to remove the carbonic substance 108 from the at least one carbon capture chamber 116a-n and into a compression system 148. In one or more embodiments, system 100 may be configured to receive gas, adsorb carbonic substance 108 to adsorbent and/or absorbent material 120, preheat carbon capture chamber 116a-n to a first temperature, use a first vacuum to remove gas 104 while isolating carbonic substance 108, increase a heat applied to carbon capture chamber 116a-n and extract carbonic substance 108 from carbon capture chamber 116a-n.

With continued reference to FIG. 1, desorption system 136 may further include a cooling system. A "cooling system" for the purposes of this disclosure is a device configured to extract heat from one or devices or components. For example, and without limitation, cooling system may be configured to extract heat from carbon capture chamber 116a-n, wherein a temperature of carbon capture chamber 116a-n may be decreased. In one or more embodiments, cooling system may include the same or a separate heat exchanger configured to provide a cooled fluid to carbon capture chamber 116a-n and extract a heat. In one or more embodiments, adsorbent and/or absorbent material may conduct heat to cooled fluid, wherein heat applied to adsorbent and/or absorbent material 120 may be extracted. In one or more embodiments, cooling system may include refrigeration system configured to pressurize a fluid in order to cool the fluid. In one or more embodiments, cooling system may include a heat exchanger similar to that of a refrigeration system, wherein the heat exchanger is configured to extract a heat from carbon capture chamber 116a-n. In one or more embodiments, cooling system is configured to a remove the heat from the at least one carbon capture chamber 116a-n upon extraction of the carbonic substance 108. In one or more embodiments, prior to re-initiating a carbon capture cycle, system 100 may be configured to cool carbon capture chamber 116a-n such that subsequently received carbonic substances 108 are capable of adsorption within adsorbent and/or absorbent material 120. In one or more embodiments, extracting heat from carbon capture chamber 116a-n may decrease molecular movement and thus allow for the carbonic substances 108 to adsorb to the adsorbent and/or absorbent material 120 through the weak van der Waals forces.

With continued reference to FIG. 1, heat exchanger, cooling system and/or vacuum system 144 may utilize a pump. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir (e.g., fluid within heat exchanger). In some cases, reservoir may be unpressurized and/or vented. Alternatively, reservoir may be pressurized and/or scaled.

With continued reference to FIG. 1, system 100 includes a compression system 148. A "Compression system" for the purposes of this disclosure is a device used to increase the pressure of a gas. In one or more embodiments, compression system 148 may include reciprocating compresses which utilize a piston moving in a cylinder to compress a gaseous substance such as carbonic substance 108. In one or more embodiments, compression system 148 may include a rotary compressor which uses two interlocking helical screws to compress gaseous substance. In one or more embodiments, compression system 148 may include but is not limited to, centrifugal compresses, axial compressors, rotary screw compressors, hydraulic piston systems and/or the like. In one or more embodiments, compression system 148 may be used to pressure a gaseous substance such as carbonic substance 108. In one or more embodiments, pressurization may allow for a volume of carbonic substance 108 to be decreased in order to increase transport efficiency. In one or more embodiments, compression of gaseous substance may cause the substance to be converted into a fluid. In one or more embodiments, compression of gaseous substance into a fluid may facilitate storage keeping of carbonic substance 108. In one or more embodiments, system 100 may be configured to compress carbonic substance 108 and place carbonic substance 108 into a rigid container capable of containing a pressurized gas 104 or fluid. In one or more embodiments, carbonic substance 108 may be extracted from carbon capture chamber 116a-n and placed into compression system 148 for compression. In one or more embodiments, compression system 148 may compress gaseous substance by increasing a pressure of gaseous substance. In one or more embodiments, compression system 148 may be configured to place gaseous substance within a rigid container for safekeeping.

With continued reference To FIG. 1, a "carbon capture cycle" or "carbonic cycle" for the purposes of this disclosure refers to a process in which system 100 extracts carbonic substance 108 from gas. In one or more embodiments, carbonic cycle may include a process of receiving gas, adsorbing carbonic substances 108, preheating carbon capture chamber 116a-n, extracting gas, extracting carbonic substances 108, cooling carbon capture chamber 116a-n, compressing carbonic substance 108 and/or any other processes as described herein. In one or more embodiments, system 100 may be configured to iteratively repeat the carbon capture cycle wherein system 100 may be configured to iteratively receive gas, isolate carbonic substance 108 and extract carbonic substance 108. In one or more embodiments, system 100 may include a plurality of carbon capture chambers, wherein each carbon capture chamber 116a-n is configured to perform a differing carbon capture cycle. For example, and without limitation, a first carbon capture may be responsible for a first carbonic cycle whereas a second carbon capture chamber may be responsible for a second carbonic cycle. In one or more embodiments, system 100 may alternate between carbon capture chambers for each carbonic cycle in order to ensure continuous receipt of gas. For example, and without limitation, a first carbon capture chamber may be configured to receive gas, wherein once the carbon capture chamber 116a-n has reached a maximum capacity of carbonic substances 108, a second carbon capture chamber may then be configured to receive gas. In one or more embodiments, carbon capture chambers may be alternated based on their availability. For example, and without limitation, once a carbonic substance 108 has been extracted from the carbon capture chamber 116a-n and the temperature is reduced, the carbon capture chamber 116a-n may then be ready to receive a subsequent gas 104 and repeat the carbon capture cycle.

With continued reference to FIG. 1, system 100 may include a controller 152. A "controller" for the purposes of this disclosure is a computing device configured to receive data and generate commands for system 100. For example, and without limitation, controller 152 may receive data from a sensor and command air intake system 112 to cease intake of gas. In one or more embodiments, controller 152 include a computing device. In one or more embodiments, controller 152 includes a processor. Processor may include, without limitation, any processor described in this disclosure. Processor may be included in a and/or consistent with computing device. In one or more embodiments, processor may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing units may retrieve instructions from a memory, decode the data, secure functions, and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor may include a plurality of multi-core processors. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently or may include two or more computing devices operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 and/or controller 152 includes a memory communicatively connected to processor, wherein the memory contains instructions configuring processor to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory may include a primary memory and a secondary memory. "Primary memory" also known as "random access memory" (RAM) for the purposes of this disclosure is a short-term storage device in which information is processed. In one or more embodiments, during use of computing device, instructions and/or information may be transmitted to primary memory wherein information may be processed. In one or more embodiments, information may only be populated within primary memory while a particular software is running. In one or more embodiments, information within primary memory is wiped and/or removed after computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor may access the information from primary memory.

With continued reference to FIG. 1, system 100 and/or controller 152 may include and/or be communicatively connected to a server, such as but not limited to, a remote server, a cloud server, a network server and the like. In one or more embodiments. In one or more embodiments, computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device. In one or more embodiments, computing device may transmit processes to server wherein computing device may conserve power or energy.

With continued reference to FIG. 1, one or more processes as described in this disclosure may be performed by server. In one or more embodiments, processor may communicate with server to receive information needed for one or more instructions tasked by processor. In one or more embodiments, server may include one or more systems and/or software configured to provide information and/or data to processor. A "server" for the purposes of this disclosure is a system that provides resources, data or services to other computing systems over a network. For example, without limitation, server may include a web server, a file server, a database server, and/or the like.

With continued reference to FIG. 1, one or more processes as described in this disclosure may be performed by server. In one or more embodiments, processor may communicate with server to receive information needed for one or more instructions tasked by processor. In one or more embodiments, server may include one or more systems and/or software configured to provide information and/or data to processor. A "server" for the purposes of this disclosure is a system that provides resources, data, or services to other computing systems over a network. For example, and without limitation, server may include a web server, a file server, a database server, and/or the like.

With continued reference to FIG. 1, controller 152 may be configured to receive moisture datum 128 as described above. In one or more embodiments, controller 152 may be configured to receive moisture datum 128 from each of a plurality of control chambers. In one or more embodiments, moisture datum 128 may indicate the presence of water moisture within carbon capture chamber 116a-n. In one or more embodiments, the presence of water moisture may affect the compression of carbonic substance 108. In one or more embodiments, controller 152 may be configured to generate command signals as a function of moisture datum 128. A "command signal" for the purposes of this disclosure refers to a set of instructions configuring a device to execute one or more commands. For example, and without limitation, command signal may include a signal to an electronic valve in order to close or open. In one or more embodiments, command signal may include but is not limited to, commands to desorption system 136 to preheat carbon capture chamber 116a-n, commands to initiate a first stage of a vacuum process, commands to heat carbon capture chamber 116a-n to a particular temperature, commands to initiate a second stage of vacuum system 144, commands to control an inlet valve and/or outlet valve and/or any other commands that may instruct one or more components mentioned herein to perform one or more actions. In one or more embodiments, controller 152 may receive moisture datum 128 and transmit a command signal to desorption system 136 to preheat carbon capture chamber 116a-n. In one or more embodiments, moisture datum 128 may indicate that moisture is present, wherein controller 152 may be configured to preheat chamber until moisture is no longer present. In one or more embodiments, controller 152 may be configured to compare moisture datum 128 to a predetermined threshold, wherein the predetermined threshold indicates the maximum amount of allowable moisture. For example, and without limitation, predetermined threshold may include 4% wherein a moisture datum 128 containing a higher than 4% moisture content may indicate to controller 152 to generate command signal. In one or more embodiments, controller 152 may generate command signal to desorption system 136 to begin a preheating process, wherein the preheating process may cease once moisture datum 128 falls below a particular threshold. In one or more embodiments, controller 152 may be configured to transmit a subsequent command signal indicating to desorption system 136 that cease preheating once the moisture levels have decreased. In one or more embodiments, controller 152 may be configured to receive moisture datum 128 and control an output of heat as a function of moisture datum 128. In one or more embodiments, controller 152 may control a power output of heating system 140 and/or heat exchanger through command signals, wherein controlling power output may control an output of heat onto carbon capture chamber 116a-n.

With continued reference to FIG. 1, controller 152 may be configured to control one or more actuators mechanically connected to one or more components of system 100. An actuator may include a component of a machine that is responsible for moving and/or controlling a mechanism or system. An actuator may, in some cases, require a command signal (e.g., command signal) and/or a source of energy or power. In some cases, a command signal may be relatively low energy. Exemplary command signal forms include electric potential or current, pneumatic pressure or flow, or hydraulic fluid pressure or flow, mechanical force/torque or velocity, or even human power. In some cases, an actuator may have an energy or power source other than command signal. This may include a main energy source, which may include for example electric power, hydraulic power, pneumatic power, mechanical power, and the like. In some cases, upon receiving a command signal, an actuator responds by converting source power into mechanical motion. In some cases, an actuator may be understood as a form of automation or automatic control.

With continued reference to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator may include a pneumatic actuator. In some cases, a pneumatic actuator may enable considerable forces to be produced from relatively small changes in gas 104 pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a command signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors, and tubular linear motors. Linear motors may be controlled directly controlled by a command signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

With continued reference to FIG. 1, controller 152 may be configured to receive a carbonic datum 132. In one or more embodiments, carbonic datum 132 may include information such as but not limited to, a saturation or amount of carbonic substance 108 within carbon capture chamber 116a-n, a temperature of carbon capture chamber 116a-n, moisture datum 128, a pressure of carbon capture chamber 116a-n and/or the like as described above. In one or more embodiments, controller 152 may be configured to control carbonic cycle as a function of carbonic datum 132. In one or more embodiments, control of carbonic cycle may include transmission of command signal to one or more components of system 100. In one or more embodiments, control of carbonic cycle may include opening or closing and inlet valve and/or outlet valve, diverting gas 104 from a first carbon capture chamber to a second carbon capture chamber, initiating a first stage of vacuum system 144, preheating carbon capture chamber 116a-n, initiating a second state of vacuum system 144 and/or the like. In one or more embodiments, controller 152 may be configured to receive carbonic datum 132 and transmit one or more command signals to desorption system 136. In one or more embodiments, command signals may instruct desorption system 136 to perform one or more actions. In one or more embodiments, an increase in moisture as indicated within carbonic datum 132 may result in the generation of command signals that instruct desorption system 136 to preheat control chamber. In one or more embodiments, controller 152 may be configured to compare carbonic datum 132 to one or more control parameters. "Control parameters" for the purposes of this disclosure refers to physical, thermal, or chemical ranges or thresholds required by system 100. For example, and without limitation, control parameters indicate a maximum temperature that can be used while still adsorbing carbonic substance 108, a maximum saturation or concentration of carbonic substance 108 within carbon capture chamber 116a-n, a minimum temperature needed during cooling, a maximum pressure that can be applied to gaseous substance and/or the like. In one or more embodiments, each control parameter may be associated with a particular command signal. For example, and without limitation, a control parameter indicating a minimum temperature needed following cooling may be associated with a command signal used to control a power output of cooling system. In another non limiting example, a maximum saturation level of carbonic substance 108 may be associated with a command signal indicating to system to cease receipt of gas 104 and proceed with the desorption process. In one or more embodiments, carbonic datum 132 may include a plurality of information received from a plurality of sensors, wherein controller 152 may be configured to compare the plurality of data to the plurality of control parameters and generate command signals respectively. In one or more embodiments, carbonic datum 132 may be iteratively received, wherein based on a particular step within the carbonic cycle, controller 152 may be configured to utilize data that is relevant to the particular step. For example, and without limitation, during the adsorption phase, controller 152 may be configured to utilize a saturation level of carbonic substance 108 to generate a command signal, whereas the saturation level may be of little importance following the compression stage. In another non-limiting example, controller 152 may be configured to identify a temperature of carbon capture chamber 116a-n during desorption, wherein controller 152 may be configured to compare the temperature to control parameters associated with increasing heat and not control parameters associated with allowing gas 104 to enter carbon capture chamber 116a-n.

With continued reference to FIG. 1, controller 152 may control a carbonic cycle of first carbon capture chamber and second carbon capture chamber. In one or more embodiments, each carbon capture chamber 116a-n may be associated with a differing and/or independent carbonic cycle. In one or more embodiments, controller 152 may be configured to control carbonic cycle by transmitting command signals to each chamber to receive gas, adsorb carbonic substance 108, vacuum carbon capture chamber 116a-n, heat carbon capture chamber 116a-n and/or the like. In one or more embodiments, controlling carbonic cycle may include regulating an alternation cycle of first carbon capture chamber and second carbon capture chamber. An "alternation cycle" for the purposes of this disclosure refers to a process in which two components are alternated for use. For example, and without limitation, system 100 may be configured to alternate between first carbon capture chamber and second carbon capture chamber based on availability. In one or more embodiments, controller 152 may regulate alteration cycle, wherein controller 152 may be configured to regulate which carbon capture cycle is available for receipt of gas. In one or more embodiments, carbonic datum 132 may indicate that the saturation level of carbonic substance 108 is high, wherein controller 152 may be configured to transmit command signal to divert receipt of gas 104 from first carbon capture chamber to second carbon capture chamber. In one or more embodiments, first carbon capture chamber may then be isolated from subsequent receipt of gas 104 and continue a process in which any adsorbed carbonic substances 108 are extracted. In one or more embodiments, once carbonic cycle has completed within first carbon capture chamber such that adsorbent and/or absorbent material 120 does not contain carbonic substance 108 and such that adsorbent and/or absorbent material 120 has been cooled, controller 152 may alternate from second control chamber back to first control chamber. In one or more embodiments, controller 152 may use carbonic datum 132 to determine if a carbon capture chamber 116a-n is ready for use. For example, and without limitation, controller 152 may identify the presence of carbonic substances 108, the temperature of carbon capture chamber 116a-n and/or the like, wherein data indicating that first carbon capture chamber is ready to undergo a subsequent carbonic cycle may indicate to controller 152 to generate a command signal to do so. In one or more embodiments, controller 152 may receive carbonic datum 132 and regulate an alternation cycle between first carbon capture chamber and second carbon capture chamber by generating and transmitting command signals. In one or more embodiments, carbon capture chamber 116a-n may include a plurality of carbon capture chambers.

With continued reference to FIG. 1, controller 152 may use actuators and/or valves to alternate between first carbon capture chamber and second carbon capture chamber. In one or more embodiments, actuators and/or valves may be used to fluidly connect air intake system 112, desorption system 136 and/or cooling system to one or more chambers. In one or more embodiments, controller 152 may be configured to transmit command signals to close valves fluidly connecting a carbon capture chamber 116a-n to one desorption system 136 air intake system 112 and/or cooling system based on the availability of said systems and/or based on the current process within the carbonic cycle. For example, and without limitation, controller 152 may isolate (through valves and/or actuator) a first carbon capture chamber from cooling system during an adsorption process. In another non-limiting example, controller 152 may limit use and/or isolate cooling system when it is being used by another carbon capture chamber 116a-n. In one or more embodiments, controller 152 may use carbonic datum 132 to identify where a particular carbon capture chamber 116a-n is within the carbonic cycle and generate command signals appropriately.

With continued reference to FIG. 1, controller 152 may use a machine learning model to receive carbonic datum 132 and generate command signals. The machine learning model may include any machine learning model as described in this disclosure. Processor may use a machine learning module, such as a classifier machine learning module for the purposes of this disclosure, to implement one or more algorithms or generate one or more machine-learning models, such as a carbon machine learning model to receive carbonic datum 132 and generate command signals. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as carbon machine learning module, may be used to create carbon machine learning model and/or any other machine learning model using training data. Carbon machine learning model may be trained by correlated inputs and outputs of training data. Training data may be data sets that have already been converted from raw data whether manually, by machine, or any other method. Carbon training data may be stored in database. Carbon training data may also be retrieved from database. In some cases, carbon machine learning model may be trained iteratively using previous inputs correlated to previous outputs. For example, processor may be configured to store previous command signals generated and previous carbonic datum 132 generated. In some cases, the machine learning model may be trained based on user input. For example, a user may indicate that determined categorizations are inaccurate wherein the machine learning model may be trained as a function of the user input. In some cases, the machine learning model may allow for improvements to computing device such as but not limited to improvements relating to comparing data items, the ability to sort efficiently, an increase in accuracy of analytical methods and the like.

With continued reference to FIG. 1, controller 152 may use carbon machine learning model to generate command signals. In one or more embodiments, carbon machine learning model may be configured to receive inputs such as carbonic datum 132 and output command signals. In one or more embodiments, carbon machine learning model may be initialized using control parameters associated with command signals. In one or more embodiments, during an initial process, carbon machine learning model may output generic and/or broad command signals, sch as for example, "increase heat by 10 degrees". In one or more embodiments, carbon machine learning model may be iteratively trained by receiving previous command signals and subsequently recorded carbonic datum 132 in order to train carbon machine learning model. In one or more embodiments, subsequently received carbonic datum 132 may include carbonic datum 132 generated and/or recorded after command signal has been generated. For example, and without limitation, command signal may include "increase heat by 10 degrees for 1 minute" in response to moisture, wherein subsequently recorded carbonic datum 132 may indicate that moisture is still present. In one or more embodiments, command signals and subsequently recorded carbonic datum 132 may be used to iteratively train carbon machine learning model to generate more accurate outputs. In one or more embodiments, subsequently recorded carbonic datum 132 may be used as feedback for carbon machine learning model to adjust command signals and/or the magnitude of command signals. In one or more embodiments, subsequently recorded carbonic datum 132 may be compared to control parameters in order to indicate if such feedback is positive feedback or negative feedback. For example, and without limitation, subsequently recorded carbonic datum 132 that adheres to one or more control parameters may indicate that feedback was positive. In one or more embodiments, each control parameter may be associated with a particular command signal, wherein carbon machine learning model may be configured to output a magnitude of each command signal. For example, and without limitation, a command signal may include instructions to apply heat, whereas a magnitude of command signal may indicate to apply 10 kilowatts of heat. Similarly, a command signal may include instructions to apply a first vacuum, whereas a magnitude may include a power output of the vacuum. In one or more embodiments, each control parameter may be associated with a particular command signal, wherein carbon machine learning model may be configured to receive carbonic datum 132, identify a control parameter that has not been met and generate a magnitude for the associated command signal. In one or more embodiments, carbon machine learning model may be iteratively trained by receiving subsequently recorded carbonic datum 132, comparing subsequently recorded carbonic datum 132 to one or more control parameter and using a change in deviation of the comparison as feedback to carbon machine learning model.

With continued reference to FIG. 1, carbonic datum 132 may include an amount of carbon substance extracted from carbon capture chamber 116*a-n*, an amount carbonic substance 108 still present in gas 104 following extraction of gas 104 and/or the like. In one or more embodiments, carbonic datum 132 may be used to identify an efficiency of system, such as an efficiency in extracting carbon. In one or more embodiments, carbonic datum 132 may be used to identify a quantity of carbonic substance 108 extracted. In one or more embodiments, carbonic datum 132 may be used to populate data sheets indicating the amount of carbon extracted by system 100 in a day, a week, a month and/or the like. In one or more embodiments, carbonic datum 132 may be appended to an existing data file in order to aggregate all information collected by system 100. In one or more embodiments, carbonic datum 132 may be displayed through a user interface.

With continued reference to FIG. 1, controller 152 may be configured to append subsequently recorded carbonic datum 132 and command signals and/or magnitudes thereof to training data. In one or more embodiments, training data may then be used to retrain carbon machine learning model.

In one or more embodiments, carbon machine learning model may be initialized with a minimal amount of training data, wherein data may be appended to training data until the model is determined to be accurate. In one or more embodiments, training data may correlate carbonic datum 132 to command signals and/or magnitude thereof. In one or more embodiments, training data may be received by a user, $3^{rd}$ party and/or the like. In one or more embodiments, controller 152 may be configured to cease addition of training data in order to increase computational efficiency once an accuracy of carbon machine learning model is determined to be suitable.

With continued reference to FIG. 1, in one or more embodiments, carbon capture system 100 may release air and/or gas 104 into a datacenter. In one or more embodiments, products of carbon capture system 100 may include a gas 104 lacking carbonic substances and/or having less carbonic substances. In one or more embodiments, gas 104 may be used to cool a data center and capture additional carbon from data center. In some embodiments, carbon capture system 100 may receive as an input gas 104 from data center, wherein carbon capture system 100 may be configured to extract carbonic substances from gas 104 and release gas 104 back into data center. In one or more embodiments, carbon capture system 100 may receive gas 104 having a high or higher temperature, wherein carbon capture system 100 may cool down gas to a lower temperature and release gas (absent carbonic substance and/or with less carbonic substance) back into data center. In one or more embodiments, air from a data center may be iteratively recycled, wherein carbon system may capture hot air, remove carbon dioxide from the air, cool the air and release the cooled air back into a data center to cool the data center. In one or more embodiments, this process may be cyclical, wherein carbon capture system 100 may be integrated into a data center and configured to iteratively capture gas 104 such as air, remove carbon dioxide from air and release air back into data center. In one or more embodiments, one or more processes of carbon capture system 100 may allow for humidity within gas 104 to be removed, such that air entering data center may contain minimal humidity. In one or more embodiments, heating system 140 may allow for the removal of water moisture within gas 104. In one or more embodiments, water moisture within gas 104 may be removed, such that a gas with low humidity is used to cool data center.

Figure 2:
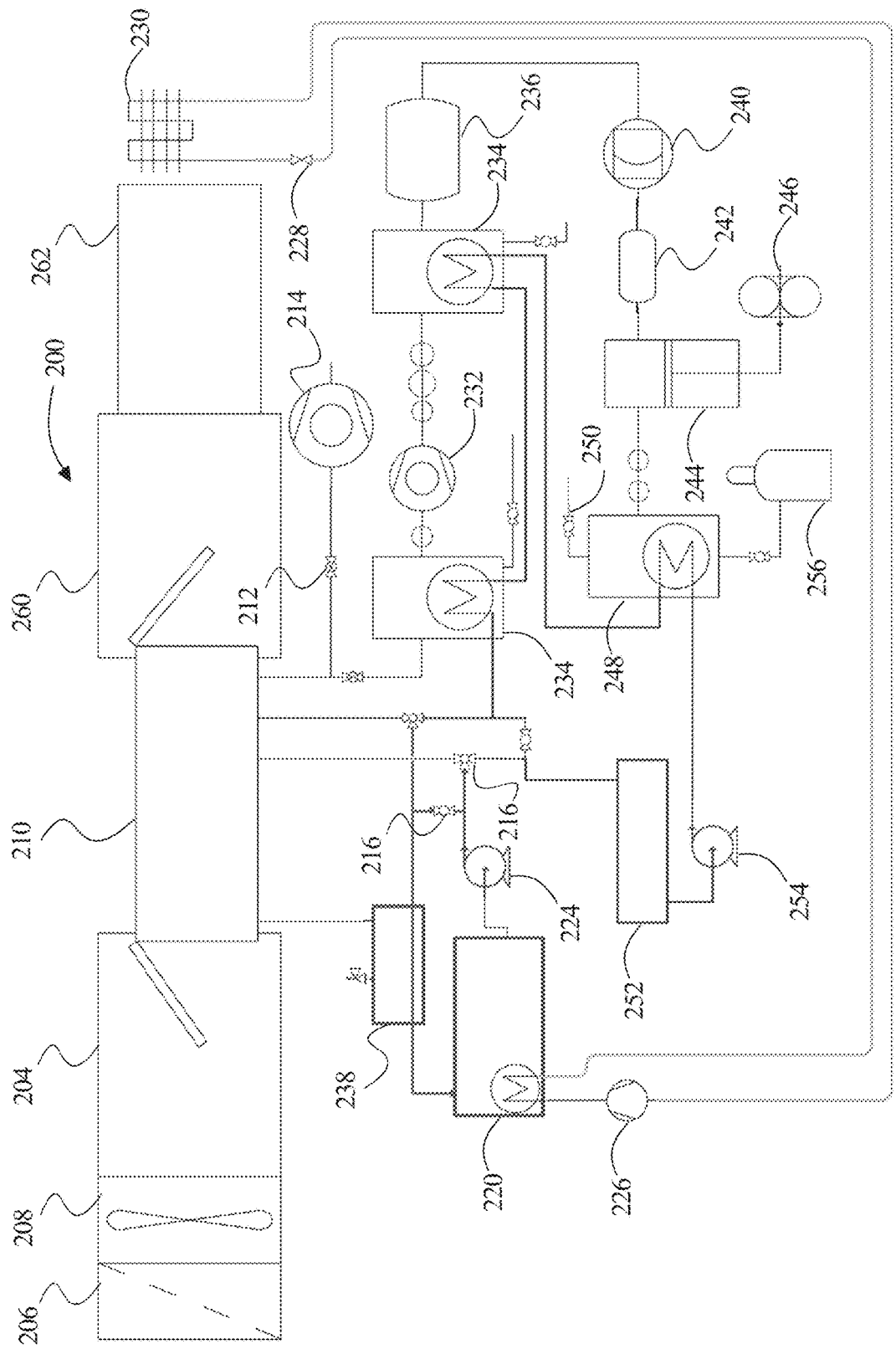
FIG. 2 is an exemplary embodiment of a direct air capture system.

Referring now to FIG. 2, another exemplary embodiment of a direct air capture system 200 is described. In one or more embodiments, direct air capture system may be consistent with carbon capture system 100 as described in reference to at least FIG. 1. In one or more embodiments, direct air capture system (DAC) 200 may include an example embodiment of a plurality of exemplary embodiments of carbon capture system 100. In one or more embodiments, DAC system 200 may include a temperature-vacuum swing adsorption process, with an intermittent steam sweep, and an amine-functionalized polymer sorbent. The sorbent may include, but is not limited to, Lewatit VP OC 1065. While a number of contactors may run in parallel in a batch process at larger scales, DAC system 200 may operate a single contactor in a batch process. In one or more embodiments, DAC system 200 may be placed in between a data center's fans and filters, and the computing units themselves, drastically driving down the cost and energy consumption of airflow for the direct air capture system 200.

With continued reference to FIG. 2, an integration of DAC system 200 with a data center may provide additional heat as a resource for desorption. In one or more embodiments, DAC system 200 may utilize resistive heating. In one or more embodiments, carbon capture system may include air-sourced heat pumps that will allow for a reduction in heating energy. Along with the benefits of shared airflow and waste heat, there are business model advantages of the integrated system, which may increase a profitability of DAC system 200.

With continued reference to FIG. 2, DAC system 200 may include an inlet plenum 204. An "inlet plenum" for the purposes of this disclosure is a chamber that facilitates the distribution of incoming air or gas into a carbon capture system. For example, and without limitation, inlet plenum may facilitate the even distribution of air (wherein air may be consistent with gas 104 as described in reference to FIG. 1) into a carbon capture chamber in order to reduce turbulence. In one or more embodiments, inlet plenum 204 may serve as a buffer zone to allow for incoming air to spready evenly through a chamber before entering a carbon capture chamber, such that the air may be evenly distributed amongst adsorbent and/or absorbent materials within a carbon capture chamber. In one or more embodiments, an air intake system as described in reference to at least FIG. 1, may include an even distribution of airflow or air pressure due to the use of turbines and/or fans. In one or more embodiments, inlet plenum 204 may serve as a buffer zone, such that air may flow evenly and/or contain minimal pressure differential prior to entering carbon capture chamber. In one or more embodiments, air within inlet plenum may be received from an air intake system as described in reference to at least FIG. 1. In one or more embodiments, air intake system may include an inlet air filter 206 that is configured to filter out dust and/or other particles that may reduce an efficiency of DAC system 200. In one or more embodiments, the filter 206 may be configured to allow only substances in a gaseous state to pass through. In one or more embodiments, air intake system may further include a primary fan 208 to pull air through filter 206 and into inlet plenum. In one or more embodiments, air may include air expelled from an exhaust system, wherein flowing air from an exhaust system may travel through filter 206 and into inlet plenum 204.

With continued reference to FIG. 2, DAC system 200 includes a capture chamber 210. In one or more embodiments capture chamber 210 may include any carbon capture chamber as described in this disclosure. In one or more embodiments, capture chamber 210 may be configured to receive air from inlet plenum 204 and facilitate an adsorption and/or desorption process. In one or more embodiments, DAC system 200 may include a plurality of capture chambers 210, wherein the plurality of capture chambers 210 may facilitate a continuous receipt of air from an exhaust system.

With continued reference to FIG. 2, DAC system 200 includes one or more contactors. In one or more embodiments, one or more contactors may be located within capture chamber 210. A "contactor" for the purposes of this disclosure is a device configured to facilitate the interaction between a gas and a capture medium. For example, and without limitation, contactor may facilitate an interaction of gas and adsorbent and/or absorbent material in order to capture carbonic substance. In one or more embodiments, the contactors are composed of aluminum and copper convective heating elements that may be coated in Lewatit sorbent. In one or more embodiments, contactors may be 14 inches tall. In one or more embodiments, contactors may be 6 feet tall. For a 520 ton/yr system, DAC system 200 may include 35 of these contactors in a multi-stream batch configuration, which will approximate to 5 streams, each with 7 contactors running in parallel. These contactors may include parallelized heating/cooling channels made of copper and may be connected through a custom manifold system. The contactors may be "structural" and wrapped with a thin shell of stainless steel which acts as the vacuum chamber. Vacuum forces are opposed by the coolant channels in one direction, and by the fins in the other direction. This approach allows a vacuum chamber's costs to be drastically reduced and allow one to use approximately 1/10th the volume of material that would be required if we built a traditional vacuum chamber that was self-supporting. A thin wall of the vacuum envelope is welded to a larger stainless-steel frame at each end, which provides support for the vacuum doors and locations for vacuum lines, coolant passthroughs, and electrical passthroughs. In one or more embodiments, contactors may include adsorbent and/or absorbent material as described in reference to at least FIG. 1, In one or more embodiments, contactors may include fins as described in reference to at least FIG. 2.

In one or more embodiments, adsorbent and/or absorbent material may include a sorbent. In one or more embodiments, the sorbent may include, Lewatit VP OC 1065, which is an amine-functionalized divinylbenzene crosslinked polymer that comes in a spherical bead form. In one or more embodiments, the sorbent is adhered to aluminum fins on the contactor by dip-coating the contactor in an adhesive bath and then dipping the contactor into a bath of sorbent particles.

With continued reference to FIG. 2, DAC system 200 includes an adsorption system. In one or more embodiments, adsorption system may facilitate the adsorption of carbonic substance as described in reference to at least FIG. 1. In one or more embodiments, airflow enters DAC system 200 through an array of MERV-6 filters (e.g., filters 206), which helps to prevent dust and other particulate matter from entering the system. Next, ambient air passes through an array of fans (e.g. primary fan 208), which operate across a pressure drop of approximately 2 inches of water. The air may then flow into an intake plenum 204 before flowing through the open vacuum doors of capture chamber 210. The velocity of the air between the fins may be around 4 m/s, although this velocity can be ramped up or down depending on energy costs, CO2 costs, weather conditions, or other factors in order to optimize the production or profitability of the system. After passing through the contactor and having the CO2 extracted, the air flow may continue to enter from the data center and into DAC system 200. The data center may be filled with graphics processing units (GPUs), which are rented out on cloud platforms. From the perspective of the carbon capture system, these act as a "black box" that provides waste heat and requires significant amounts of airflow. By placing the data center inside the DAC system 200, there are significant savings due to shared capital costs and operating costs. Separately, the two systems would require two sets of fans and filters. There are also substantial savings due to the sharing of power electronics, building and construction costs, civil engineering, sighting, permitting, and other infrastructure. This shared infrastructure helps to drive down the cost of DAC system 200, effectively using the data center to subsidize the cost of DAC system 200, while also providing waste heat and reduced fan energy costs due to the shared filtration. There are also significant business model synergies which are further in this disclosure. After air flows through the data center and is warmed, the CO2 (e.g. carbonic substance) flows through the evaporator side of an air-sourced heat pump. The heat pump and waste heat from the data center greatly reduce the energy consumption required to regenerate the sorbent. After exiting the evaporator, the airflow exits the system entirely. In one or more embodiments, additional climate control systems may not be needed in order to keep temperatures or humidities within operational bounds when the system is operated in a moderate climate. In one or more embodiments, adsorption system may include adsorbent and/or absorbent materials as described in this disclosure, such as contactors, fins and/or the like.

With continued reference to FIG. 2, DAC system 200 includes a desorption system. Once the sorbent (e.g. adsorbent and/or absorbent material) has adsorbed a sufficient amount of CO2, the vacuum chamber doors close, and a pump valve 212 opens to a purge vacuum pump 214. This purge vacuum pump 214 may include a rotary screw pump and may be responsible for pumping down the capture chamber 210 as quickly as possible to remove the atmospheric gases before CO2 is desorbed. A separate pump may be required so that the product CO2 stream is not continually contaminated with excess nitrogen, oxygen, etc. In one or more embodiments, purge vacuum pump 214 may include and/or be included within vacuum system as described in this disclosure. In one or more embodiments, purge vacuum pump 214 may be configured to extract air within capture chamber, wherein the air now lacks at least some carbon dioxide which has been adsorbed within capture chamber 210. In one or more embodiments, purge vacuum pump may be fluidly connected to capture chamber 210 through pipes and/or lines that allow for air to be sucked from capture chamber. In one or more embodiments, pump valve 212 may open and/or close a connection between purge vacuum pump and capture chamber 210, such that when pump valve 212 is open, purge vacuum pump may be configured to extract air from capture chamber. In one or more embodiments, purge vacuum pump may extract air and/or gas and expel air into surround atmosphere.

Once the capture chamber 210 is down to approximately 20 torr, hot water valves 216 may open to allow hot water to rush into the contactor's heating lines, rapidly heating the contactor. These hot water lines may be consistent with heat exchanger as described in reference to at least FIG. 1. In one or more embodiments, hot water valves 216 may allow for water to flow from a hot tank 220 holding hot water. In one or more embodiments, a heat pump 224 may be used to flow hot water from hot tank 220 and through water valves 216 and into capture chamber 210. In one or more embodiments, the introduction of heat such as hot water may increase molecular activity and this result in carbon dioxide being desorbed from adsorbent and/or absorbent material. In one or more embodiments, during an initial stage of heating capture chamber 210, the first material to be desorbed from the sorbent is water, and so the purge vacuum pump 214 remains connected for several seconds to allow for this water to be removed from the system and to reduce the condensing load on the system. Then the pump valve 212 may be closed such that carbon dioxide may be desorbed and float freely within capture chamber 210. In one or more embodiments, water and/or a fluid within hot tank 220 may be heated using a heat pump compressor 226. In one or more embodiments, the heat pump compressor 226 may pressurize a refrigerant gas and thus significantly increase the temperature of the refrigerant gas. The high temperature and high-pressure refrigerant may then move to a condenser coil with hot tank 220 and heat a liquid such as water within hot tank 220 using conduction. In one or more embodiments, hot tank 220 may operate at a temperature of 90 to 95 degrees Celsius. The refrigerant may then be cooled due to the heat transfer from the refrigerant to the liquid within hot tank 220. The refrigerant may then be transferred to an expansion valve 228, wherein the expansion valve 228 may reduce a pressure of the refrigerant and thus drop the temperature of the refrigerant as well. Following use of the expansion valve, the refrigerant may include a low pressure and low temperature refrigerant. The refrigerant may then be pass through one or more heat exchanger coils 230, such that the refrigerant may absorb heat from a surrounding atmosphere and increase in heat. The refrigerant, now containing, an ambient temperature and low pressure may then be transferred back to the heat pump compressor 226 to be compressed into a high temperature and high-pressure refrigerant for use in hot tank in a subsequent cycle of carbon capture.

With continued reference to FIG. 2, shortly after hot water begins flowing through capture chamber 210, the purge vacuum pump 214 may be closed off from the system and an extraction pump 232 may be connected. In one or more embodiments, extraction pump 232 may include a pump configured to extract carbon dioxide from capture chamber 210. In one or more embodiments, following purge of air from capture chamber 210, a desorption process may begin where in carbon dioxide is desorbed from adsorbent and/or absorbent material and suspended within carbon capture chamber. Extraction vacuum pump 232 may then be used to extract carbon dioxide from capture chamber 210. For a 520 ton/yr system, the extraction pump 232 may be a rotary screw pump, such as a Leybold DV1200 or two DV650s. It is imperative that these pumps are hermetically sealed in order to avoid contamination of the CO2 product. Shell and tube condensers 234 may be located both before and after the extraction pump 232, which greatly reduces the gas volume that is required to be pumped. These condensers 234 may run at 5° C., along with a liquid CO2 condenser 248. After the product CO2 is brought to atmospheric pressure, it flows into an intermittent buffer vessel 236, which may include a gas bag. Gas bags have certain advantages over pressure vessels, such as always operating at atmospheric pressure, which simplifies instrumentation and control processes, and extends the life of the vacuum pump. In one or more embodiments, intermittent buffer vessel 236 may include a container as described above. In one or more embodiments, carbonic substance such as C02 may be placed in intermittent buffer vessel 236 following carbonic cycle.

In one or more embodiments, desorption system may include an addition of a steam sweep gas through the latter portions of the desorption cycle, which help to reduce the partial pressure of CO2 in the vacuum chamber and accelerate the desorption process. DAC system 200 may include a steam generator 238 that allows for intermittent injection of steam into capture chamber 210, which may allow for implementation of any improvements to DAC system 200.

In one or more embodiments, DAC system 200 may allow for the sequestration of CO2 underground and to sell carbon credits to slow or reverse the effects of climate change and global warming. In one or more embodiments, DAC system 200 may further be used to make beverage-grade CO2 that can be re-used for a wide variety of purposes. Once the CO2 is in a buffer vessel, it is compressed using a CO2 compressor 240 to approximately 100 PSI to 125 PSI. This pressure may be chosen because the equipment is widely available and can tap into the compressed air industry's equipment for things like filters, desiccants, air lines, fittings, and more. The compressed CO2 passes through a desiccant bed 242

(e.g. Sorbead Air WS) to strip out any remaining water in the system, dropping the dew point to below −50° C., allowing one to meet the requirements for ISBT beverage grade. Compressed air may feed into a pressure amplifier 244, such as a Haskel Q-drive gas compressor, exiting at around 750 PSI. An air compressor 246 may be used to increase the pressure of the pressure amplifier 244. The air compressor 246 may drive a piston to compress the CO2 into a smaller volume and thereby increase pressure. The compressed CO2 may increase in temperature as an increase in pressure may result in an increase in pressure. The compressed CO2 may pass through a CO2 condenser 248 to cool the pressurized CO2, such that the CO2 decreases in temperature while still maintaining a high pressure. The condensed CO2 may include CO2 in a pressurized liquid form. As the CO2 condenses, any impurities may reside in a head space, which is periodically purged. Through a purge valve 250. The CO2 condenser may cool the CO2 using liquid from a cold tank 252. The cold tank 252 may include chilled liquids and/or gases. The cold tank 252 may include a liquid at 5 degrees Celsius. The cold tank 252 may supply cooled fluid to multiple condensers and/or cooling systems of DAC system 200 using a cold pump 254. In one or more embodiments, cold tank 252 may supply a cooled liquid to capture chamber 210 in order to cool down capture chamber and prepare capture chamber 210 for subsequent receipt of air. The CO2 that condenses flows to the bottom of the column, and then periodically empties into a holding tank 256, from which beverage-grade CO2 is distributed.

With continued reference to FIG. 2, in one or more embodiments, DAC system 200 may include an outlet plenum 260. An "outlet plenum" for the purposes of this disclosure refers to a chamber that is connected to an outlet of capture chamber 210. In one or more embodiments gas may flow through inlet plenum 204 and out through outlet plenum 260 during an initial adsorption phase, such that air passes through carbon capture chamber and carbon dioxide is extracted from the air and adsorbed to the adsorbent and/or absorbent material. In one or more embodiments, outlet plenum 260 may facilitate the outflow of air once air has passed through capture chamber 210. In one or more embodiments, outlet plenum may facilitate the movement of air in which carbon dioxide has been extracted. In one or more embodiments, once carbon dioxide has been fully adsorbed. Carbon capture chamber 210 may be sealed from input plenum and output plenum, wherein purge vacuum pump 214 may extract any residual air that remains within capture chamber 210.

With continued reference to FIG. 2, energy consumption of DAC system 200 may be in the range of 800 kWh/ton-1000 800 kWh/ton of CO2. The efficiency gains at this step are largely due to improvements in component efficiency, reduction in thermal mass, and reduction of parasitic energy losses. There are still substantial energy efficiency savings that remain, and that will be pursued with increased scale. In one or more embodiments, vacuum pumping may be performed in multiple stages, with additional moisture removal between each step, which greatly reduces pumped volume and increases efficiency. Large numbers of contactors allow for improved staging, which allows the system to operate more like a continuous process rather than many batches. This improvement in staging allows for equipment to be run more often at its point of maximum efficiency and will also help to improve equipment longevity. A substantial improvement in energy efficiency can be achieved by reducing the energy consumed for heating and cooling the contactors. In one or more embodiments, the largest source of energy consumption in DAC system 200 may include the heat exchanger such as heat pump. Improving the utilization of waste heat from the data center can drastically cut this energy consumption. The addition of multiple temperature stages can also help to reduce the energy consumption substantially, i.e. by maintaining a medium-temperature tank of water that can be used to both increase the temperature of contactors at the beginning of the desorption cycle and can be used to rapidly bring the temperature of hot contactors back toward room temperature.

With continued reference to FIG. 2, DAC system 200 may include custom-built contactors, rather than relying on off-the-shelf contactors that are sourced from local radiator manufacturers. A custom design will allow for improved tube spacing, fin spacing, and reduction in thermal mass, which can help to reduce the thermal energy loads on the system. Current contactor designs may utilize the Lewatit VP OC 1065 powder as it comes from the manufacturer, with one drying step before coating takes place. In one or more embodiments, separation of the particles by size and optimization of size distribution that gets used on contactors may increase efficiency. Large particles have the greatest capacity for CO2 adsorption but also require longer times for CO2 to diffuse to the interior of the particle. By optimizing the particle size distribution, DAC system 200 can reduce the energy consumption and improve the kinetics of the system by optimizing the capacity of the particles vs their thermal mass.

With continued reference to FIG. 2, DAC system 200 may be controlled by a DAC control system 262. In one or more embodiments, DAC control system 262 may include a controller as described in reference to at least FIG. 1. A provocative DAC control system 262 is a networked system split into several components: module, rack, and infra. Modules are groupings of CO2 DAC contactor assemblies that are controlled together by one module board. Racks are groupings of modules that are controlled and sequenced by one rack board. Infra are groupings of supporting infrastructure components such as heat pumps, compressors, etc. The control system communications network follows a hub-and-spoke topology. Application code running on a computer (the "hub") communicates with CANbus networks (the "spokes") containing rack and infra nodes. Each rack then contains a single linear CANbus network containing module nodes.

With continued reference to FIG. 2, all valves in DAC system 200 may be controlled via pneumatics, which helps to decrease costs and simplify control. Each contactor has water lines in and out, a vacuum line out, a steam line in, and an auxiliary port for other sensors inside the vacuum chamber, such as thermocouples or other sensors that may be added as needed. Each stage of contactors running together requires a hot water and cold-water inlet and outlet valve, a steam on/off valve, a purge vacuum valve, an extraction vacuum valve, and electrical lines for sensors. Each stage of contactors requires water temperature sensing, vacuum pressure sensing, and CO2 concentration sensing at the outlet, which can also be paired with air temperature and humidity sensing for low cost. Additional sensors include CO2 concentration sensors, flow meters, dew point sensors, and differential pressure sensors.

With continued reference to FIG. 2, Power for DAC system 200 may be sourced from the local grid, with the potential to integrate on-site solar and batteries.

Detailed State-Point Diagram

With further reference to the particular implementation, the system described in reference to at least FIG. 1 and FIG.

2 has been modeled and simulated, for instance and without limitation in python. A mass and energy balance has been conducted, with results posted below. Contactor kinetics have also been simulated using a finite-difference approach, with sorbent capacity modeled using a temperature-dependent Toth model (2). The results for the model are described in table 1 below.

TABLE 1

State point properties, with state points correlating to the diagram shown in at least FIG. 1 and FIG. 2

| State point | Temp (° C.) | Pressure (Pa) | mass flow (kg/s) | volumetric flow (m$^3$/s) | enthalpy (J/kg) | entropy (J/kg) | density (kg/m$^3$) | relative humidity | mass fraction CO2 | mole fraction CO2 |
|---|---|---|---|---|---|---|---|---|---|---|
| 0 | 25 | 101325 | | | 44949 | 161.5 | 1.18 | 40 | | |
| 1 | 25 | 101325 | 57.58 | 48.85 | 44949 | 161.5 | 1.18 | 40 | | |
| 2 | 25 | 101213 | 57.58 | 48.904 | 44972 | 161.9 | 1.18 | 40 | | |
| 3 | 26 | 101695 | 57.58 | 48.776 | 45522 | 162.4 | 1.18 | 38.5 | | |
| 4 | 31 | 101445 | 57.56 | 49.685 | 49608 | 176.5 | 1.16 | 27.3 | | |
| 7 | 35 | 101375 | 57.56 | 50.507 | 54473 | 192.5 | 1.14 | 20.8 | | |
| 8 | 35 | 101325 | 57.56 | 50.46 | 54028 | 191.2 | 1.14 | 21.3 | | |
| 14 | 85 | 6666 | 0.0549 | 0.89 | 1431803 | 5749.6 | 0.06 | | 0.585 | 0.366 |
| 15 | 5 | 7333 | 0.0339 | 0.261 | 595877 | 3506.2 | 0.13 | | 0.948 | 0.881 |
| 16 | 258 | 101325 | 0.0339 | 0.036 | 845731 | 3604.6 | 0.94 | | 0.948 | 0.881 |
| 17 | 5 | 101325 | 0.0322 | 0.017 | 496155 | 2702.5 | 1.93 | | 0.996 | 0.991 |
| 18 | 180 | 700000 | 0.0322 | 0.004 | 653705 | 2774.6 | 8.2 | | 0.996 | 0.991 |
| 20 | 5 | 700000 | 0.0321 | 0.0023 | 482267 | 2296.2 | 13.95 | | 1 | 1 |
| 21 | 186 | 5000000 | 0.0321 | 0.0005 | 635548 | 2365.1 | 60.74 | | 1 | 1 |
| 22 | 14 | 5000000 | 0.0321 | | | | | | 1 | 1 |
| 30 | 5 | 7333 | 0.021 | 2.10E−05 | 26 | 76.3 | 999.92 | | | |
| 31 | 5 | 101325 | 0.0017 | 1.66E−06 | 21120 | 76.3 | 999.97 | | | |
| 32 | 5 | 700000 | 9.77E−05 | 9.76E−08 | 21716 | 76.2 | 1000.26 | | | |

Key equipment parameters may be determined using a simulation model and can be illustrated and described in a table below. The power consumption of the major equipment results in an overall power consumption of 153 KW, or just over 1320 kWh/ton of CO2. The results are described in Table 2 below.

TABLE 2

Major equipment power consumption

| Major component | Efficiency | Power consumption | Tentative equipment |
|---|---|---|---|
| Vacuum pump | $\eta_s$ = 75% | 9 kW | Leybold DV 650 x2 |
| Compressor | $\eta_s$ = 75% | 5.4 kW | Atlas Copco G5 |
| Pressure Amplifier | $\eta_s$ = 80% | 4.9 kW | Haskel HGD-150 |
| Fan | $\eta_s$ = 75% | 21 kW (DAC share) | Hartzell 03U0-15-BU100BN x3 |
| Chiller | COP = 4 | 19.3 kW | York YCAL |
| Heat Pump | COP = 3 | 82.3 kW | Solid energy LW80IB |

With further reference to the particular implementation, the system described in reference to at least FIG. 1 and FIG. 2 has been modeled and/or simulated. A mass and energy balance may be conducted; exemplary results are posted below. Contactor kinetics may also be simulated using a finite-difference approach, with sorbent capacity modeled using a temperature-dependent Toth model (2).

Figure 3:
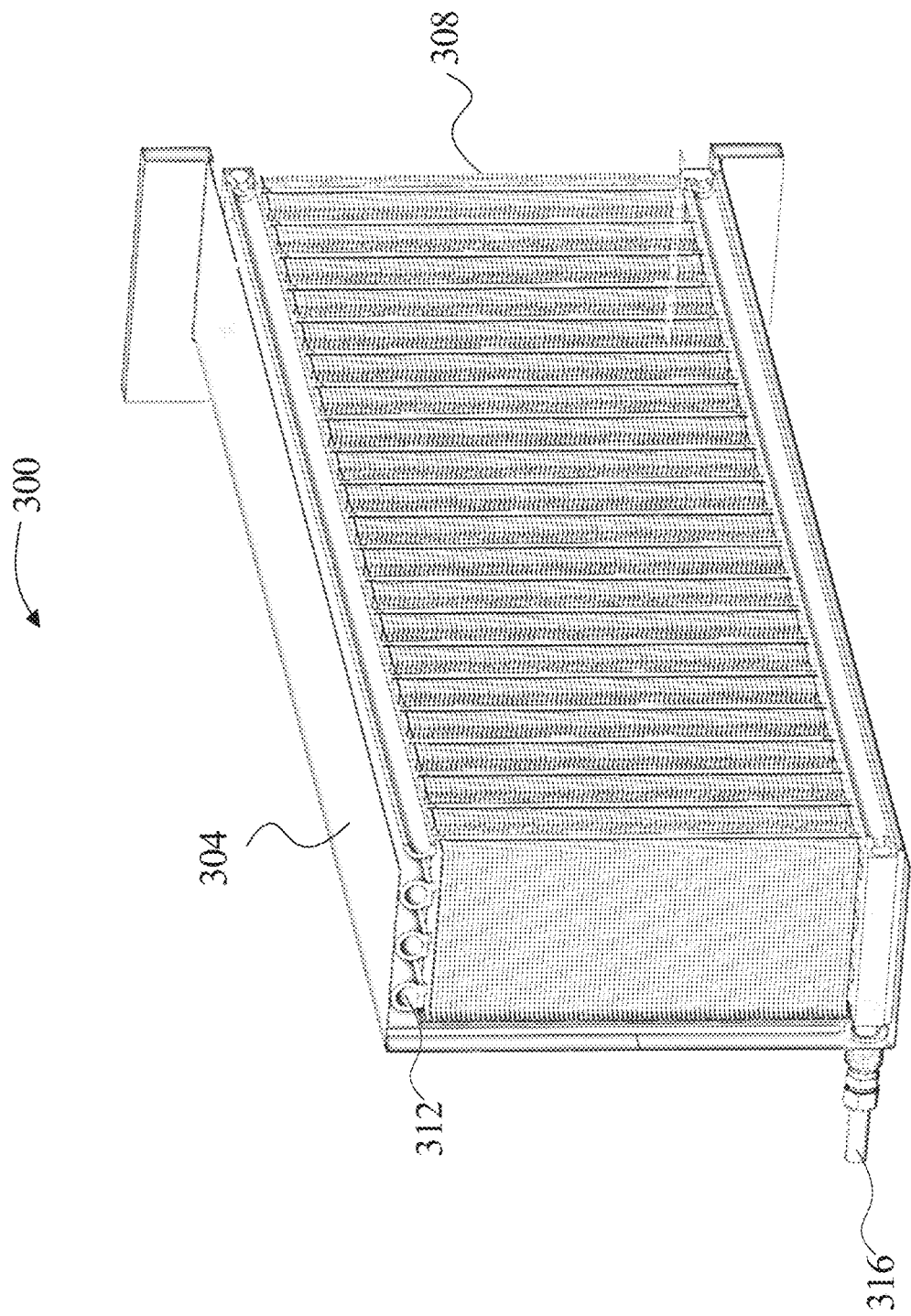
FIG. 3 is an example embodiment of a cross sectional view of a carbon capture chamber.

Referring now to FIG. 3, an exemplary embodiment of a cross-sectional view of a carbon capture chamber 300 is described. In one or more embodiments, carbon capture chamber may also be referred to as a "Vacuum Chamber." In one or more embodiments, carbon capture chamber 300 may serve as an active carbon capture system, wherein carbon capture chamber 300 may be configured to adsorb carbonic substances such as $CO_2$. In one or more embodiments, a gas such as air is blown through the carbon capture chamber 300. In one or more embodiments, carbon capture chamber may include one or more walls 304 that are used to provide a structure to carbon capture chamber 300. In one or more embodiments, walls 304 may ensure that carbon capture chamber 300 is capable of providing a sealed environment from the atmosphere. In one or more embodiments, walls 304 may provide structural rigidity such that carbon capture chamber does not collapse or buckle under negative pressure. In one or more embodiments, carbon capture chamber may be similar to that of a container, wherein walls 304 may provide the structure of the container. In one or more embodiments, walls may be made of a structurally rigid material such as aluminum, copper a metal, a metal alloy and/or the like. In one or more embodiments, walls 304 may be made of thermally conductive materials in order to facilitate a heat transfer between an inside of carbon capture chamber 300 and an outside of carbon capture chamber 300.

The carbon capture chamber may include a plurality of fins 308 made of a thermally conductive material, such as any thermally conductive material as described in this disclosure. In one or more embodiments, the plurality of fins 308 may include and/or be included in a material body as described in reference to at least FIG. 1. In one or more embodiments, the plurality of fins 308 may include a thermally conductive material such as any material as described in this disclosure which contains thermal properties capable of transferring heat. In one or more embodiments, the thermally conductive material may be covered and/or coated with an adsorbent and/or absorbent material that $CO_2$ will attach to at a low temperature. In one or more embodiments, the thermally conductive material may provide for efficient heat transfer between the adsorbent and/or absorbent material and the thermally conductive material in order to facilitate an adsorption or desorption process. In one or more embodiments, once the carbonic substances are adsorbed to the adsorbent and/or absorbent material, the air may be sucked out of carbon capture chamber using a vacuum system such as any vacuum system as described in this disclosure. The vacuum system may expel any air within carbon capture chamber 300 while leaving the carbonic substances which remain adsorbed to the adsorbent and/or absorbent material. In one or more embodiments, the fins 308 may be heated up in order to facilitate a desorption process. In one or more embodiments, air may transfer through fins, wherein carbonic substances may adsorb to a surface of fins during the transfer. In one or more embodiments, fins 308 may include adsorbent and/or absorbent material as described in reference to at least FIG. 1. In one or more embodiments, fins may provide for increased surface area between air passing through carbon capture chamber 300. In one or more embodiments, fins may include substantially planar surfaces in which air passes through and adsorbs to a surface of fins 308. In one or more embodiments, fins 308 may include a plurality of sheets stacked above one another and spaced evenly to allow for air to pass through the sheets. In one or more embodiments, fins 308 may include a structurally rigid material such as a metal or metal alloy in order to contain a pressure within carbon capture chamber 300. In one or more embodiments, fins may include substantially planar sheets that allow for maximum surface area contact between air and an adsorbent and/or absorbent coating on fins 308. In one or more embodiments, heating of the fins 308 will allow for heat to transfer to adsorbent and/or absorbent material and thereby cause increased molecular activity which will result in the desorption of carbonic substance from adsorbent and/or absorbent material. In one or more embodiments, fins 308s may be heated by pumping hot water through pipes thermally connected to the fins 308. This process may release the $CO_2$ into the surrounding atmosphere of the carbon capture chamber. In one or more embodiments, a second vacuum is then used to expel the carbonic substances in the carbon capture chamber. In one or more embodiments, following desorption, the carbonic substances may be suspended in a gaseous format, where a vacuum may be used to retrieve the gaseous format from the chamber. In one or more embodiments, following removal of carbonic substances, the fins 308 may be cooled (e.g. using cold water and/or a heat exchanger as described in this disclosure) and carbon capture chamber 300 is repressurized and/or reopened in order to accept new air and restart the carbonic cycle.

With continued reference to FIG. 3, in one or more embodiments, fins 308 may extend laterally across carbon capture chamber from an inlet to an outlet. In one or more embodiments, the inlet may be defined as the location at which air and/or gas enters carbon capture chamber, wherein outlet may be defined as the location at which air or gas leaves carbon capture chamber.

With continued reference to FIG. 3, a system as described in reference to FIGS. 1-2 may utilize multiple chambers permitting some carbon capture chambers to run adsorption cycles while others are desorbing (pulling vacuum). Such a process would allow continuous airflow. In addition, such as process would allow for individual modules (also referred to as "individual carbon capture chambers") to be taken offline for repair or swapped with replacements while the system continues to operate. Downstream, the CO2 may be further purified by removing water vapor and then cooled to form liquid or pumped into pressurized tanks. The whole system can be integrated into a datacenter that uses air (at least partially) to cool servers/computers, or any other setup where air has to be moved through for other reasons, such as, but not limited to, an apartment or office buildings with active ventilation/HVAC systems. In one or more embodiments, systems described herein may be implemented and/or integrated into data centers and/or existing devices that utilize airflow in order to remove carbon from the air flowing through said devices.

With continued reference to FIG. 3, carbon capture chamber 300 may include a plurality of tubes 312. In one or more embodiments, tubes may serve as a component of heating element and/or heat exchanger as described in this disclosure. In one or more embodiments, heated gases and/or fluids may flow through tubes 312 in order to provide heat to carbon capture chamber 300. In one or more embodiments, carbon capture chamber may be heated through conduction, wherein heat from liquids such as water may heat tubes 312 and heat from tubes may be transferred to fins 308. In one or more embodiments, tubes 312 and fins 308 may contain a thermally conductive material that allows for heat to transfer between tubes and fins 308. In one or more embodiments, tubes 312 may be configured to hold a cooled liquid as well, wherein the cooled liquid may absorb heat from carbon capture chamber and fins 308. In one or more embodiments, liquids may flow within tubes 312 through the use of a cooling pump and/or a heating pump.

With continued reference to FIG. 3, it may be the case that vacuum chambers require a lot of structural strength, or they risk implosion due to pressure differences caused by the use of a vacuum. Such an implosion may be mitigated through the use of thick sidewalls, reinforcing ribs, and/or particular (e.g., cylindrical) shapes. In one or more embodiments, carbon capture chamber 300 may include a plurality of fins 308 and/or tubes 312 that can both facilitate in the carbonic cycle and simultaneously provide structural support to carbon capture chamber. In one or more embodiments, carbon capture chamber 300 may be designed with much thinner walls that will "suck onto" the fins 308/tubes 312 when the vacuum is pulled and be held there against collapse (transverse) or buckling (longitudinal). In one or more embodiments, the use of fins 308 and tubes 312 to provide structural support will ensure that the only place where thicker material is needed is on the ends (e.g. the inlet and outlet) of the carbon capture chamber. This can work on any transverse cross-sectional shape, but is especially useful for rectangular cross-sections, which are cheap to make and easy to fill: better for cost-effective and reliable mass production. The walls could be made from the sort of plastic used for vacuum sealing but will probably be metal or a heat-resistant hard plastic.

With continued reference to FIG. 3, both the fins 308 and the tubes 312 can provide support for the walls of carbon capture chamber 300. In one or more embodiments, the fins 308 may provide structural support from side to side, while the tubes 312 provide structural support perpendicularly to the fins 308 and from top to bottom. As the vacuum chamber gets bigger and bigger, the walls have to get increasingly thicker. In one or more embodiments, use of fins 308 and tubes 312 as structural support for carbon capture chamber may allow for an increase in size to carbon capture chamber without decreasing structural rigidity of carbon capture chamber. In one or more embodiments, a vacuum chamber without internals such as fins 308 and ribs may collapse when increased in size due to structural deficiencies. In one or more embodiments, fins 308 and tubes 312 may perform the thermal exchange/adsorption process while providing structural rigidity to carbon capture chamber 300 as well. In one or more embodiments, fins 308 may fill the chamber transversely, while tubes 312 fill carbon capture chamber 300 vertically, to provide (in a first direction and a second direction) structural integrity against negative pressure.

With continued reference to FIG. 3, carbon capture chamber may include a heat exchanger and/or heating component 316 as described in reference to at least FIGS. 1-2. In one or more embodiments, heating component 316 may include a heat transfer structure. The heat transfer structure may also serve as a structural member contacting the external walls and taking the loads (e.g. by preventing buckling). In one or more embodiments, the heat transfer structure may include any material that is thermally conductive. This may include any material as described in this disclosure. In one or more embodiments, thermally conductive material may further include copper or aluminum. Rails may be composed of any materials or combination of materials including without limitation aluminum, stainless steel, or plastic (including without limitation plastic able to take high temperatures-such as chlorinated polyvinyl chloride (CPVC), nylon, polyether ether ketone (PEEK) ranging from 50 to 90 degrees Celsius). Exterior walls of carbon capture chamber could be stainless, aluminum, or even plastic (could be quite weak, as thin as a plastic bag such as a high-tensile plastic bag). In one or more embodiments, heating component 316 may include and/or be fluidly connected to tubes 312, wherein a fluid from heating component may flow through tubes 312.

Figure 4:
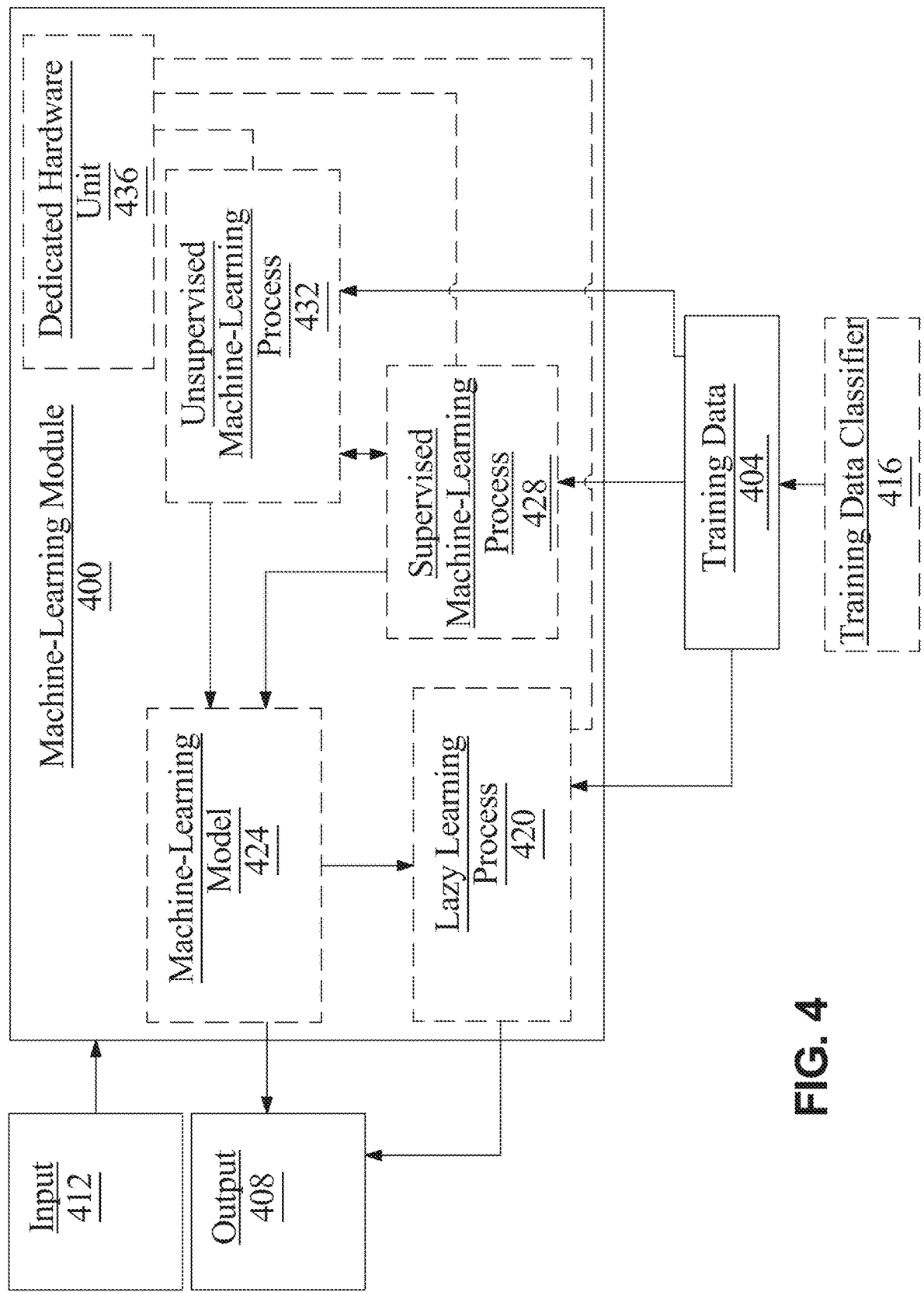
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include moisture datum and/or carbonic datum and outputs may include command signals.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to control parameters, wherein each control parameter may be associated with a differing command signal and/or device within system 100.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P(B/A) P (A)÷P(B), where P (A/B) is the probability of hypothesis A given data B also known as posterior probability; P(B/A) is the probability of data B given that the hypothesis A was true; P (A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 456 pixels, however a desired number of pixels may be 128. Processor may downsample the high pixel count image to convert the 456 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include carbonic datum as described above as inputs, command signals and/or magnitudes thereof as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
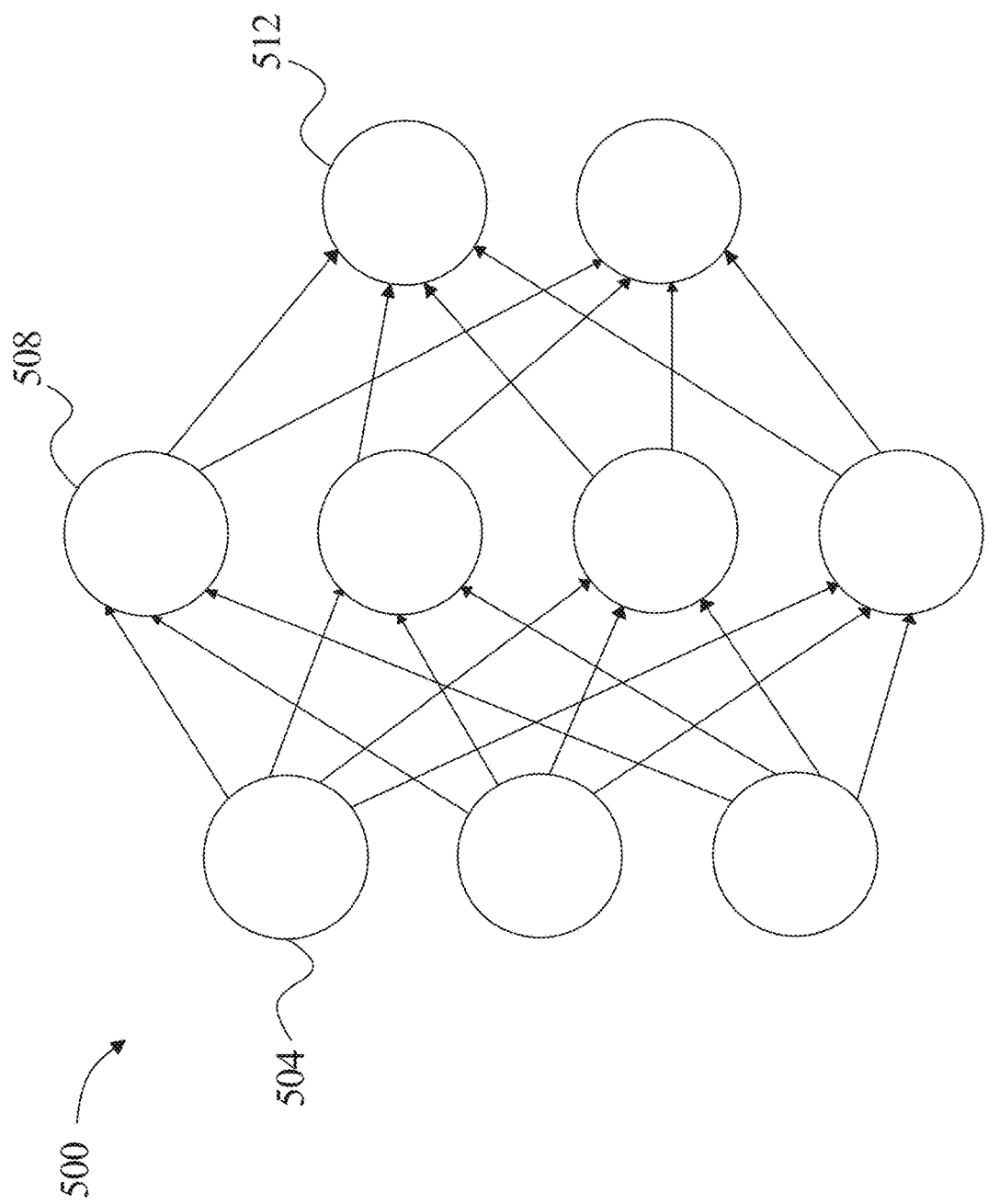
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
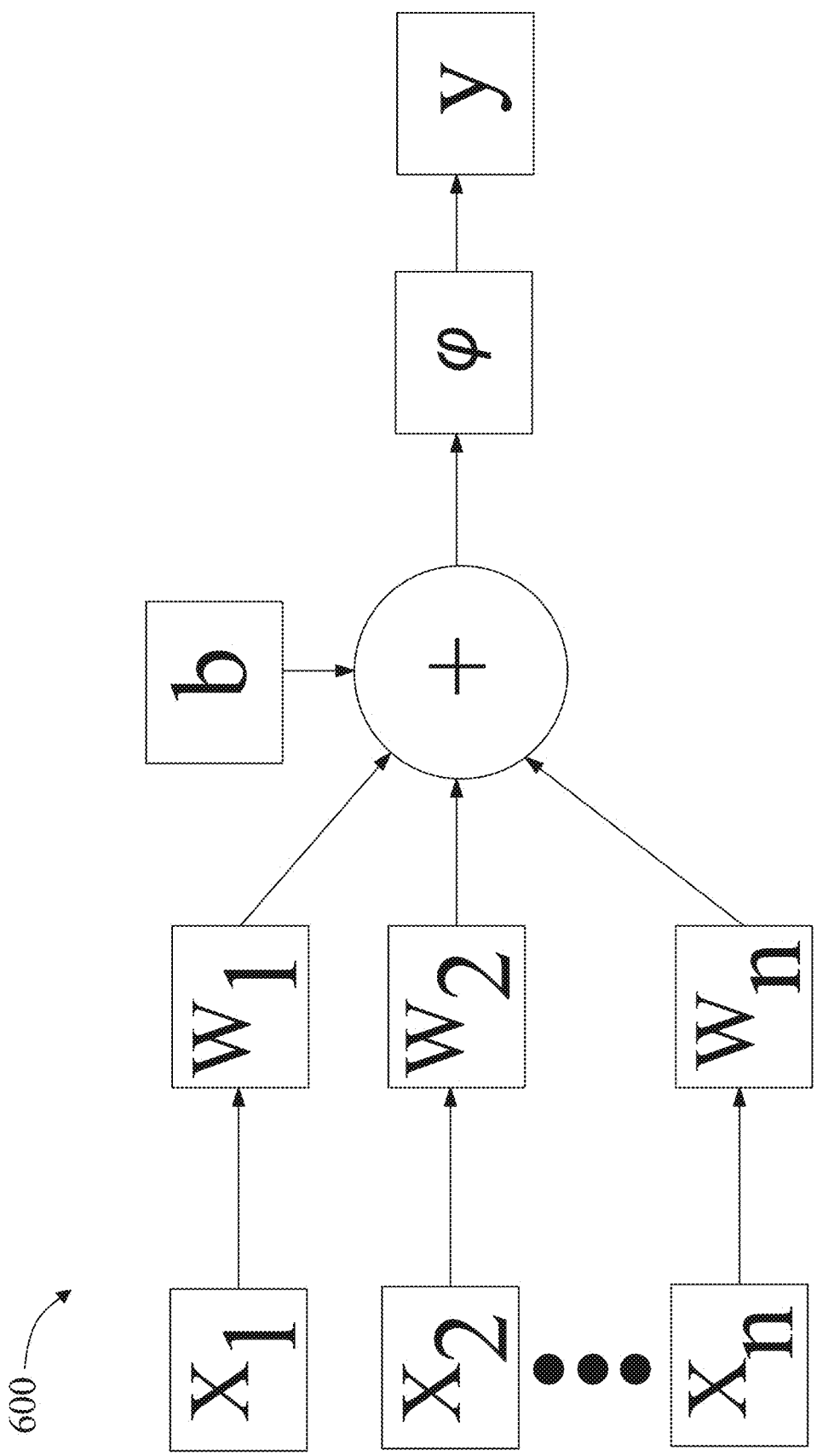
FIG. 6 is a block diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
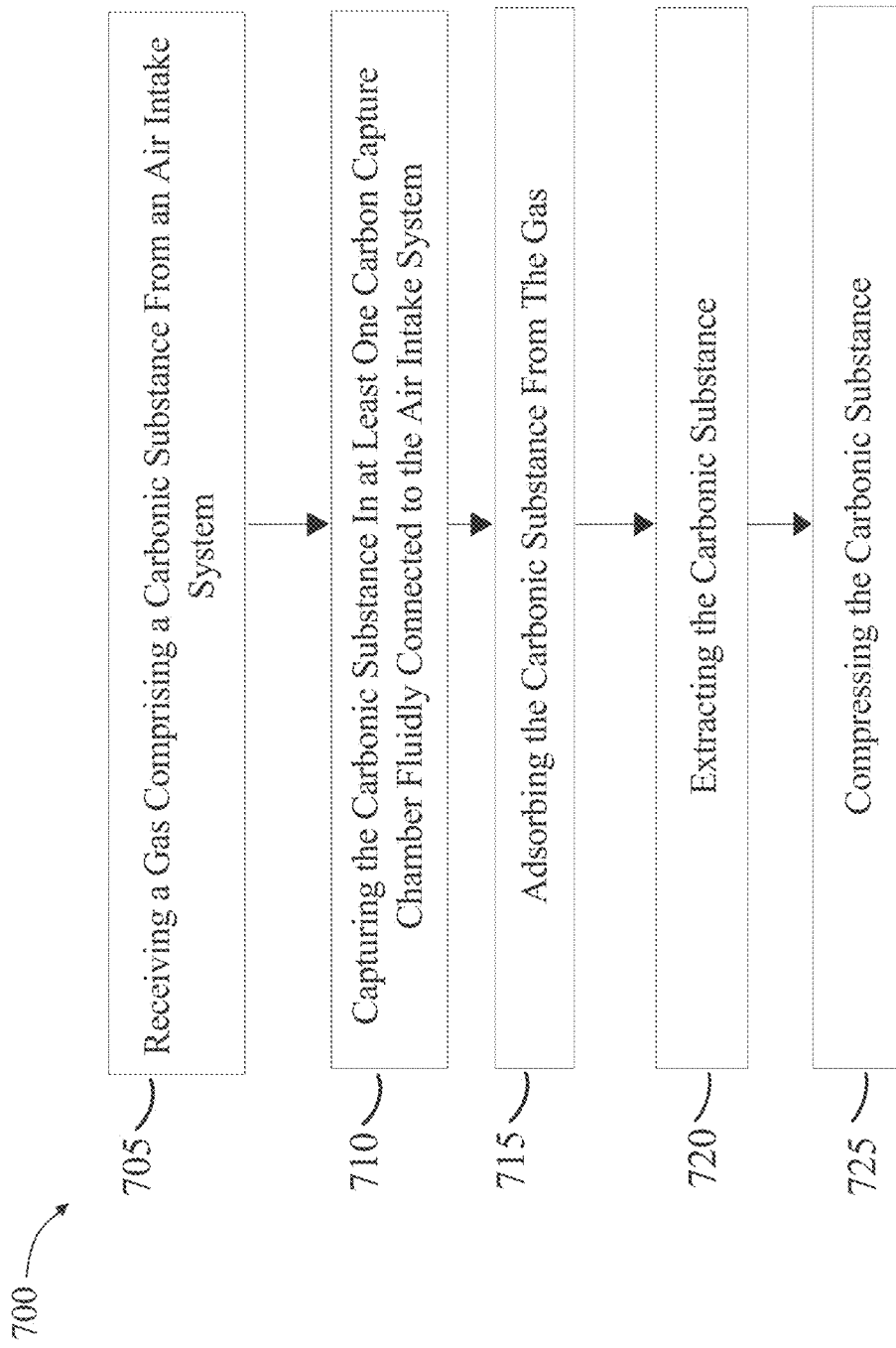
FIG. 7 is a flow diagram illustrating an exemplary embodiment of a method of use of a carbon capture system.

Referring now to FIG. 7, an exemplary embodiment of a method 700 of use for a carbon capture system is described. At step 705, method 700 includes receiving a gas comprising a carbonic substance from an air intake system. This may be implemented with reference to FIGS. 1-5.

With continued reference to FIG. 7, at step 710 method 700 includes capturing the carbonic substance in at least one carbon capture chamber fluidly connected to the air intake system, wherein the at least one carbon capture chamber comprising one or more adsorbent and/or absorbent materials, the one or more adsorbent and/or absorbent materials configured to adsorb the carbonic substance from the gas. In one or more embodiments, the one or more adsorbent and/or absorbent materials comprises one or more carbon capture tubes and the at least one carbon capture chamber comprises a first carbon capture chamber and a second carbon capture chamber, wherein the first carbon capture chamber and the second carbon capture chamber are configured to provide a continuous receipt of the gas.

With continued reference to FIG. 7, at step 715 method 700 includes adsorbing the carbonic substance from the gas using the one or more adsorbent and/or absorbent materials within the at least one carbon capture chamber.

With continued reference to FIG. 7, at step 720 method 700 includes extracting the carbonic substance from the at least one carbon capture chamber using a desorption system, the desorption system comprising a heating system configured to apply a heat to the at least one carbon capture chamber and remove the carbonic substance from the one or more adsorbent and/or absorbent materials and a vacuum system configured to extract the carbonic substance from the at least one carbon capture chamber. In one or more embodiments, measuring, using a plurality of sensors in the first carbon capture chamber and the second carbon capture chamber, a carbonic datum and receiving, using a controller, the carbonic datum and controlling, using the controller, a carbonic cycle of the first carbon capture chamber and the second carbon capture chamber as a function of the carbonic datum. In one or more embodiments, controlling, using the controller, the carbonic cycle comprises regulating an alternation cycle of the first carbon capture chamber and the second carbon capture chamber as a function of the carbonic datum. In one or more embodiments, controlling, using the controller, the carbonic cycle comprises transmitting one or more command signals to the desorption system. In one or more embodiments, at least one sensor of the plurality of sensors comprises a nondispersive infrared sensor configured to measure a concentration of the carbonic substance in the first carbon capture chamber and the second carbon capture chamber. In one or more embodiments, the heating system comprises a heat exchanger comprising a fluid, wherein the fluid is configured to provide the heat to the at least one carbon capture chamber through a conduction process. In one or more embodiments, the vacuum system comprises a first vacuum configured to isolate the carbonic substance by removing the gas from the at least one carbon capture chamber and a second vacuum configured to remove the carbonic substance from the at least one carbon capture chamber and into the compression system.

With continued reference to FIG. 7, at step 725 method 700 includes the desorption system further comprises a cooling system, the cooling system configured to a remove the heat from the at least one carbon capture chamber upon extraction of the carbonic substance. In one or more embodiments, method 700 further includes measuring, using a moisture sensor of the desorption system, a moisture datum of the at least one carbon capture chamber and receiving, using a controller, the moisture datum and controlling, using the controller, an output of the heat as a function of the moisture datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
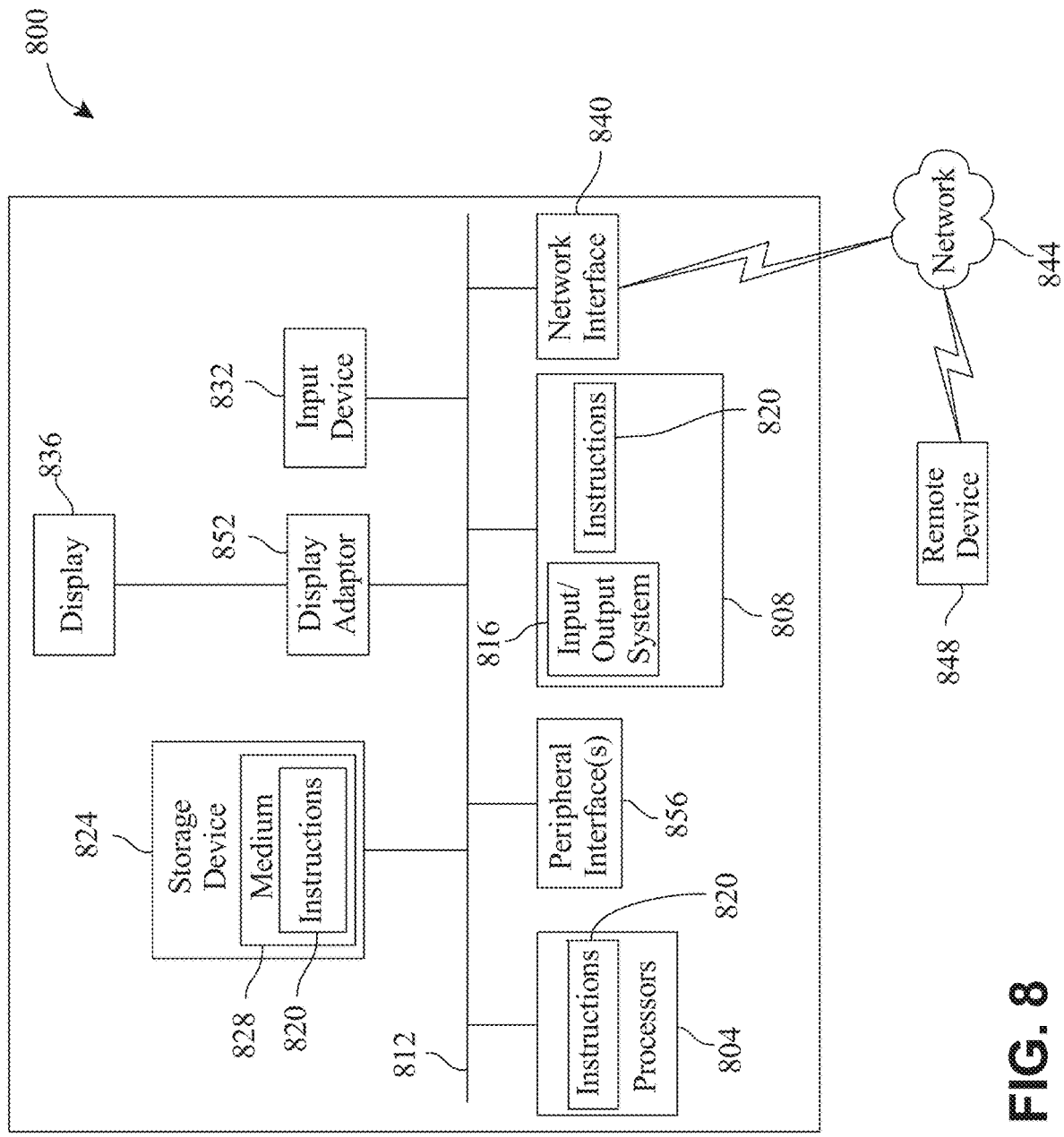
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A carbon capture system comprising:
an air intake system configured to receive a gas comprising a carbonic substance;
at least one carbon capture chamber fluidly connected to the air intake system, the at least one carbon capture chamber comprising one or more adsorbent materials, the one or more adsorbent materials configured to adsorb the carbonic substance from the gas;
a desorption system, the desorption system comprising:
a heating system configured to apply a heat to the at least one carbon capture chamber and remove the carbonic substance from the one or more adsorbent materials; and
a vacuum system configured to extract the carbonic substance from the at least one carbon capture chamber; and
a compression system configured to compress the carbonic substance, wherein
the desorption system comprises a moisture sensor configured to measure a moisture datum of the at least one carbon capture chamber; and
the carbon capture system comprises a controller configured to:
receive the moisture datum and control an output of the heat as a function of the moisture datum.

2. The carbon capture system of claim 1, wherein the desorption system further comprises a cooling system, the cooling system configured to a remove the heat from the at least one carbon capture chamber upon extraction of the carbonic substance.

3. The carbon capture system of claim 1, wherein:
the one or more adsorbent materials comprises one or more carbon capture tubes; and
the at least one carbon capture chamber comprises:
a first carbon capture chamber; and
a second carbon capture chamber, wherein the first carbon capture chamber and the second carbon capture chamber are configured to provide a continuous receipt of the gas.

4. The carbon capture system of claim 3, the carbon capture system further comprising:
a plurality of sensors in the first carbon capture chamber and the second carbon capture chamber, the plurality of sensors configured to measure a carbonic datum; and
a controller configured to:
receive the carbonic datum; and
control a carbonic cycle of the first carbon capture chamber and the second carbon capture chamber as a function of the carbonic datum.

5. The carbon capture system of claim 4, wherein controlling the carbonic cycle comprises regulating an alternation cycle of the first carbon capture chamber and the second carbon capture chamber as a function of the carbonic datum.

6. The carbon capture system of claim 4, wherein controlling the carbonic cycle comprises transmitting one or more command signals to the desorption system.

7. The carbon capture system of claim 4, wherein at least one sensor of the plurality of sensors comprises a nondispersive infrared sensor configured to measure a concentration of the carbonic substance in the first carbon capture chamber and the second carbon capture chamber.

8. The carbon capture system of claim 1, wherein the heating system comprises a heat exchanger comprising a fluid, wherein the fluid is configured to provide the heat to the at least one carbon capture chamber through a conduction process.

9. The carbon capture system of claim 1, wherein the vacuum system comprises:
a first vacuum configured to isolate the carbonic substance by removing the gas from the at least one carbon capture chamber; and
a second vacuum configured to remove the carbonic substance from the at least one carbon capture chamber and into the compression system.

10. The carbon capture system of claim 1, wherein the air intake system is configured to receive the gas from an exhaust system.

11. The carbon capture system of claim 10, wherein the exhaust system comprises an air cooling system of a data center.

12. A method of use of a carbon capture system, the method comprising:
receiving a gas comprising a carbonic substance from an air intake system;
capturing the carbonic substance in at least one carbon capture chamber fluidly connected to the air intake system, wherein the at least one carbon capture chamber comprising one or more adsorbent materials, the one or more adsorbent materials configured to adsorb the carbonic substance from the gas;
adsorbing the carbonic substance from the gas using the one or more adsorbent materials within the at least one carbon capture chamber;
extracting the carbonic substance from the at least one carbon capture chamber using a desorption system, the desorption system comprising:
a heating system configured to apply a heat to the at least one carbon capture chamber and remove the carbonic substance from the one or more adsorbent materials; and
a vacuum system configured to extract the carbonic substance from the at least one carbon capture chamber;
compressing the carbonic substance into a carbonic liquid using a compression system;
measuring, using a moisture sensor of the desorption system, a moisture datum of the at least one carbon capture chamber;

receiving, using a controller, the moisture datum; and
controlling, using the controller, an output of the heat as a function of the moisture datum.

13. The method of claim 12, wherein the desorption system further comprises a cooling system, the cooling system configured to a remove the heat from the at least one carbon capture chamber upon extraction of the carbonic substance.

14. The method of claim 12, wherein:
the one or more adsorbent materials comprises one or more carbon capture tubes; and
the at least one carbon capture chamber comprises:
a first carbon capture chamber; and
a second carbon capture chamber, wherein the first carbon capture chamber and the second carbon capture chamber are configured to provide a continuous receipt of the gas.

15. The method of claim 14, the method further comprising:
measuring, using a plurality of sensors in the first carbon capture chamber and the second carbon capture chamber, a carbonic datum;
receiving, using a controller, the carbonic datum; and
controlling, using the controller, a carbonic cycle of the first carbon capture chamber and the second carbon capture chamber as a function of the carbonic datum.

16. The method of claim 15, wherein controlling, using the controller, the carbonic cycle comprises regulating an alternation cycle of the first carbon capture chamber and the second carbon capture chamber as a function of the carbonic datum.

17. The method of claim 15, wherein controlling, using the controller, the carbonic cycle comprises transmitting one or more command signals to the desorption system.

18. The method of claim 15, wherein at least one sensor of the plurality of sensors comprises a nondispersive infrared sensor configured to measure a concentration of the carbonic substance in the first carbon capture chamber and the second carbon capture chamber.

19. The method of claim 15, wherein the heating system comprises a heat exchanger comprising a fluid, wherein the fluid is configured to provide the heat to the at least one carbon capture chamber through a conduction process.

20. The method of claim 15, wherein the vacuum system comprises:
a first vacuum configured to isolate the carbonic substance by removing the gas from the at least one carbon capture chamber; and
a second vacuum configured to remove the carbonic substance from the at least one carbon capture chamber and into the compression system.

21. The method of claim 12, receiving the gas comprises receiving the gas from an exhaust system fluidly connected to the air intake system.

22. The method of claim 21, wherein the exhaust system comprises an air cooling system of a data center.

* * * * *